US007095146B2

(12) United States Patent
Fukazawa et al.

(10) Patent No.: US 7,095,146 B2
(45) Date of Patent: Aug. 22, 2006

(54) MOTOR HAVING HOUSING MEMBER

(75) Inventors: Tamotsu Fukazawa, Kanagawa (JP); Hiroaki Nakahara, Kanagawa (JP)

(73) Assignee: Tokyo R&D Co., Ltd., Tokyo (JP)

( * ) Notice: Subject to any disclaimer, the term of this patent is extended or adjusted under 35 U.S.C. 154(b) by 66 days.

(21) Appl. No.: 10/485,943

(22) PCT Filed: Jul. 29, 2002

(86) PCT No.: PCT/JP02/07696

§ 371 (c)(1),
(2), (4) Date: Feb. 5, 2004

(87) PCT Pub. No.: WO03/015239

PCT Pub. Date: Feb. 20, 2003

(65) Prior Publication Data

US 2004/0232786 A1 Nov. 25, 2004

(30) Foreign Application Priority Data

Aug. 6, 2001 (JP) ............................. 2001-237913

(51) Int. Cl.
*H02K 5/00* (2006.01)
*H02K 7/00* (2006.01)
*H02K 19/36* (2006.01)
*H02K 11/00* (2006.01)

(52) U.S. Cl. .................... 310/89; 310/67 R; 310/68 R; 310/71

(58) Field of Classification Search ................ 310/89, 310/296, 269, 67 R, 85, 71
See application file for complete search history.

(56) References Cited

U.S. PATENT DOCUMENTS 2,905,010 A * 9/1959 Rieser ...................... 74/421 A
3,213,404 A * 10/1965 Hedstrom .................. 439/425

(Continued)

FOREIGN PATENT DOCUMENTS

WO    WO 00/75991 A1 * 12/2000

*Primary Examiner*—Darren Schuberg
*Assistant Examiner*—Erik Preston
(74) *Attorney, Agent, or Firm*—Takeuchi&Kubotera, LLP

(57) ABSTRACT

A running motor (100) used for vehicles is provided with a stator (200), a rotor (300) and a housing (400) for holding them, wherein the rotor has a support member (330) for preventing rotor magnets (320) from separating from a laminated steel sheet (310), the laminated steel sheet has a plurality of first steel sheets (311) each formed slots (311a) through which the rotor magnets are inserted respectively and a second steel sheet (312) to which the insertion ends of the rotor magnets are pressed, and the plurality of first steel sheets and the second steel sheet are configured to have mutually the same contour. The housing includes a control (500) for supplying a coil (210) of the motor with power and a sensor (600) for detecting a position of the rotor. Further, the housing includes a first housing member (410) for covering the stator and the rotor, a second housing member (420) for dividing the interior of the housing, and a third housing member (430) for covering the control. A bearing (401) for the rotor is fitted to the first housing member and the second housing member, respectively.

7 Claims, 25 Drawing Sheets

U.S. PATENT DOCUMENTS

| | | | |
|---|---|---|---|
| 4,494,052 A * | 1/1985 | Kelleher et al. | 318/254 |
| 4,724,347 A * | 2/1988 | Reinhardt et al. | 310/68 R |
| 5,087,497 A * | 2/1992 | Suzuki et al. | 428/66.6 |
| 5,909,067 A * | 6/1999 | Liadakis | 310/14 |
| 6,054,818 A * | 4/2000 | Tabata et al. | 318/139 |
| 6,081,056 A * | 6/2000 | Takagi et al. | 310/89 |
| 6,229,235 B1 * | 5/2001 | Ellis et al. | 310/89 |
| 6,333,576 B1 * | 12/2001 | Ishikawa et al. | 310/85 |
| 6,456,515 B1 * | 9/2002 | Rose, Sr. | 363/144 |
| 6,617,719 B1 * | 9/2003 | Sunaga et al. | 310/64 |
| 6,624,543 B1 * | 9/2003 | Bankstahl | 310/91 |
| 6,700,253 B1 * | 3/2004 | Ohnuma et al. | 310/89 |
| 6,704,201 B1 * | 3/2004 | Kasuga | 361/704 |

* cited by examiner

MOTOR HAVING HOUSING MEMBER

TECHNICAL FIELD

The present invention relates to a motor provided with a stator, a rotor and a housing for holding them, which is used, for example, as a motor for running a vehicle. The housing has a control for supplying the motor coil with power and a sensor for detecting a position of the rotor disposed therein.

BACKGROUND ART

As the running motors used for vehicles such as electric vehicles and electric scooters, a DC motor, a DC brushless motor and the like are used extensively. Generally, such a type of motor is configured by assembling a stator, a rotor and a housing for holding them, and the housing has therein a control for supplying the coil of the motor with power and a sensor for detecting a position of the rotor.

It should be noted that the motors can now be available with higher revolutions and higher torque with advancement of a control technology and enhancement of the performance of permanent magnets. As a result, a delicate structure of individual parts of a motor, such as the coaxiality of the stator and the rotor and the heat radiation property of the control, has become more significant in order to secure its performance satisfactorily.

In recent years, importance is now attached to spreading of electric vehicles, electric scooters and the like as a series of environmental measure, and the running motor is also required to be superior in productivity, of higher performance and inexpensiveness.

The present invention has been made under the above-described circumstances and has an object to provide a rationally configured motor.

DISCLOSURE OF THE INVENTION

The invention recited in a first aspect of the application relates to a motor provided with a stator, a rotor and a housing for holding them, wherein the rotor is provided with a laminated steel sheet in which rotor magnets are inserted and a support member which prevents the rotor magnets from coming out of the laminated steel sheet, the laminated steel sheet includes a plurality of first steel sheets, each having a slot through which the rotor magnet is inserted and a second steel sheet to which the insertion ends of the rotor magnets are pressed, and the plurality of first steel sheets and the second steel sheet have mutually the same contour and laminated with their contours aligned, and the motor is configured very rationally.

Specifically, when the plurality of steel sheets configuring the laminated steel sheet are formed to have the slots and the rotor magnets are inserted into the slots, it is necessary to prevent the rotor magnets from coming out from either end of the laminated direction. Conventionally, a support member is disposed on each of both ends of the laminated direction, but the present invention has the second steel sheet at one end and the support member at the other end. Therefore, the support member at one end can be omitted, and component parts and assembling steps can be simplified.

Especially, the first steel sheets and the second steel sheet have the same contour, so that there is an advantage that a common mold can be used to stamp them. Where the common mold is used, a press machine having a first stroke for stamping into the prescribed contour and a second stroke for boring the slots may be used to form the first steel sheets by the first and second strokes and to form the second steel sheet by the first stroke.

Considering unnecessary leakage of magnetism or the like, a hole having a size through which the rotor magnets are not inserted may be formed in the second steel sheet.

The invention described in a second aspect of the application relates to a motor provided with a stator, a rotor and a housing for holding them, wherein the stator and the housing are assembled using a jig, the jig is provided with a stator support for supporting the stator and a housing positioning means for positioning the housing with respect to the stator, and the housing is positioned by the housing positioning means and assembled by fitting with the stator, and the motor is configured very rationally.

Specifically, according to the invention, the housing is shrink-fitted to the stator using the jig provided with the stator support part and the housing positioning means, so that the stator and the housing can be assembled very accurately. Particularly, machining to form a key groove in the stator or the housing can be omitted.

The invention described in a third aspect of the application relates to a motor provided with a stator, a rotor and a housing for holding them, wherein the housing includes a first housing member and a second housing member, each having a bearing for supporting the rotor, the first housing member is provided with a recess for fitting the bearing therein, and the bearing is fixed by press-fitting a pipe of the same material as the first housing member into the recess, and the motor is configured very rationally.

Specifically, Conventionally, the bearing is fixed with a retainer or by tightening a screw member. Meanwhile, the present invention fixes the bearing by press-fitting the pipe into the recess, so that it is advantageous in view of elimination of an error in fabrication size of each member and reduction of part costs, and the bearing can be fixed accurately and easily. The pipe is inserted with force by a press machine or the like. And, it is considered that the pipe is desirably formed by extrusion molding.

Besides, when the pipe is of the same material as the first housing member, an influence by the thermal expansion can be avoided. Specifically, when they are made of different materials, respectively, the pipe may become loose due to a difference in expansion coefficient if the motor coil generates heat, but such a disadvantage can be avoided without fail by the present invention.

Particularly, when the end of the pipe is externally protruded from the housing, the protruded portion of the pipe can be used as a drive engine positioning means to connect the drive engine to the motor. Thus, this configuration makes it possible to secure the coaxial property of the motor and the drive engine with ease.

The invention described in a fourth aspect of the application relates to a motor provided with a stator, a rotor and a housing for holding them, wherein the housing includes a first housing member and a second housing member each having a bearing for supporting the rotor and a pin for mutually positioning the first housing member and the second housing member, the first housing member is formed a recess into which the pin is inserted, and the second housing member is formed a hole through which the pin is inserted, and the pin is formed a shoulder on its middle part to prevent the pin from coming out of the hole, and the motor is configured very rationally.

Specifically, according to the invention, the second housing member is assembled to the first housing member with the hole aligned with the pin after inserting the pin into the first housing member. The pin as the positioning means is provided with the shoulder at its middle portion, so that there is no worry that the pin comes out because it is blocked by the second housing member. The first housing member and the second housing member are fixed by screwing or the like.

The invention described in a fifth aspect of the application relates to a motor provided with a stator, a rotor and a housing for holding them, wherein a control for supplying a coil of the motor with power is disposed within the housing, the housing includes a first housing member for covering the stator and the rotor, a second housing member for dividing the interior of the housing and a third housing member for covering the control, a through portion, through which wiring of the oil is passed, is disposed between the inner surface of the housing and the second housing member, and the second housing member has a holding surface for holding the wiring of the coil along the inner surface of the housing, and the motor is configured very rationally.

Specifically, a mechanical stress applied to the wiring of the coil can be reduced because the holding surface for holding the wiring is disposed on the second housing member. Assuming that the wiring of the coil is swayed unstably due to the vibration of the motor, it causes increase of the mechanical stress. However, with the present invention, the mechanical stress can be reduced securely.

The invention described in a sixth aspect of the application relates to a motor provided with a stator, a rotor and a housing for holding them, wherein a sensor for detecting a position of the rotor is disposed within the housing, the sensor has Hall elements disposed on a substrate, the substrate includes a plurality of terminals for connecting the Hall elements, and the sensor supports CW and CCW in rotation direction of the rotor by selecting an arrangement pattern of the Hall elements, and the motor is configured very rationally.

Specifically, the sensor of the invention can support both of CW (clock wise) and CCW (counter clock wise) by selecting a terminal to connect the Hall elements. When this sensor is adopted, it is possible to use a common member to produce motors having a rotor with a different rotation direction.

The invention described in a seventh aspect of the application relates to a motor provided with a stator, a rotor and a housing for holding them, wherein a control for supplying a coil of the motor with power and a sensor for detecting a position of the rotor are disposed within the housing, the housing includes a first housing member for covering the stator and the rotor, a second housing member for dividing the interior of the housing and a third housing member for covering the control, the second housing member has a through portion through which wiring of the sensor is inserted, and a shielding member which shields the through portion while allowing the passage of the wiring of the sensor, and the shielding member has a holding surface for holding the wiring of the sensor along the side wall of the second housing member, and the motor is configured very rationally.

Specifically, the wiring of the sensor can be reduced a mechanical stress applied to it because the holding surface for holding the wiring is disposed on the shielding member.

Assuming that the wiring of the sensor is swayed unstably within the housing due to the vibration of the motor, this causes increase of the mechanical stress. However, with the present invention, the mechanical stress can be reduced securely.

The invention described in an eighth aspect of the application relates to a motor provided with a stator, a rotor and a housing for holding them, wherein a control for supplying a coil of the motor with power and a sensor for detecting a position of the rotor are disposed within the housing, the housing includes a first housing member for covering the stator and the rotor, a second housing member for dividing the interior of the housing and a third housing member for covering the control, the rotor comprises an encoder magnet, and the sensor has Hall elements reacting to the encoder magnet, one end of the rotor is inserted through the second housing member, and the encoder magnet is attached to one end of the rotor, and the sensor and the encoder magnet are shielded from the coil side by the second housing member, and the motor is configured very rationally.

Specifically, when the coil of the motor generates heat, the detection of a position of the rotor by the sensor might be somewhat affected adversely by the heat, but such a problem can be avoided by the present invention because the sensor and the encoder magnet are shielded from the coil side by the second housing member.

The invention described in a ninth aspect of the application relates to the motor according to the eighth aspect, wherein the rotor includes the rotor magnets, and the rotor magnets and the encoder magnet are supported by the rotor and then polarized simultaneously.

Specifically, when the encoder magnet is supported by the rotor having the rotor magnets polarized, an angle of attaching the encoder magnet may be deviated subtly, but according to the present invention, the rotor magnets and the encoder magnet are polarized after the encoder magnet is supported by the rotor, so that the encoder magnet can be disposed very accurately, and it is possible to improve the accuracy of detecting a position of the rotor by the sensor.

Especially, it is preferable that the rotor magnets and the encoder magnet are polarized with the polarization jigs for polarizing them integrated.

The invention described in a tenth aspect of the application relates to a motor provided with a stator, a rotor and a housing for holding them, wherein a control for supplying a coil of the motor with power is disposed within the housing, the housing includes a first housing member for covering the stator and the rotor, a second housing member for dividing the interior of the housing and a third housing member for covering the control, the housing is assembled by supporting the control by the third housing member and supporting it by the first housing member, the control has a power supply terminal for supplying the coil with power, the third housing member has an opening for exposing the power supply terminal and a lid for covering the opening, and wiring of the coil is connected to the power supply terminal by manipulating through the opening after supporting the third housing member by the first housing member and the second housing member, the motor is configured very rationally.

Specifically, according to the present invention, the motor assembling work can be facilitated, and unnecessary sagging of the wiring of the coil can be remedied.

If the third housing member is assembled to the first housing member and the second housing member after the wiring of the coil is connected to the control, the wiring of the coil is required to have some allowance in length, and the extra length causes the unwanted sagging. But, with the present invention, such a disadvantage can be avoided.

The invention described in an eleventh aspect of the application relates to a motor provided with a stator, a rotor and a housing for holding them, wherein a control for supplying a coil of the motor with power is disposed within the housing, the control includes a switching element for switching the passage of current to the coil, the switching element is fixed to a radiator having electrical conductivity and fixed to the housing via an insulating sheet, the radiator is used as a power supply terminal for supplying the coil with power, the housing, the insulating sheet and the radiator are assembled and screwed using a jig, the jig is provided with a pin, and the housing, the insulating sheet and the radiator are provided with a guide for guiding the pin, and the motor is configured very rationally.

Specifically, the switching element is fixed to the radiator having electrical conductivity and fixed to the housing via the insulating sheet, so that heat radiation can be made efficiently. The radiator can be used as the power supply terminal for supplying the coil with power.

Besides, the jig according to the invention includes the pin to be guided by the guides of the housing, the insulating sheet and the radiator, and they can be assembled accurately and easily by using the jig.

The invention described in a twelfth aspect of the application relates to a motor provided with a stator, a rotor and a housing for holding them, wherein a control for supplying a coil of the motor with power is disposed within the housing, the control includes a switching element for switching the passage of current to the coil, the switching element is fixed to a radiator having electrical conductivity and fixed to the housing via an insulating sheet, the radiator is used as a power supply terminal for supplying the coil with power, and the insulating sheet protrudes from the opposed surfaces of the radiator and the housing, and the motor is configured very rationally.

Specifically, the switching element is fixed to the radiator having electrical conductivity and fixed to the housing via the insulating sheet, so that heat radiation can be made efficiently. The radiator can be used as the power supply terminal for supplying the coil with power Besides, when the insulating sheet is configured to protrude from the opposed surfaces of the radiator and the housing, the leakage of current between the radiator and the housing can be prevented efficiently, and safety is improved.

The invention described in a thirteenth aspect of the application relates to a motor provided with a stator, a rotor and a housing for holding them, wherein a control for supplying a coil of the motor with power is disposed within the housing, the control includes a switching element for switching the passage of current to the coil, the switching element is fixed to a radiator having electrical conductivity and fixed to the housing via an insulating sheet, the radiator is used as a power supply terminal for supplying the coil with power, and the wiring of the coil is provided with a crimp terminal which is screwed to the radiator, and the radiator has a protrusion to which the crimp terminal is screwed, and the motor is configured very rationally.

Specifically, the switching element is fixed to the radiator having electrical conductivity and fixed to the housing via the insulating sheet, so that heat radiation can be made efficiently. The radiator can be used as the power supply terminal for supplying the coil with power Besides, when the wiring of the coil is provided with the crimp terminal and the radiator has the protrusion for screwing the crimp terminal to the radiator, the radiator and the wiring of the coil can be connected efficiently by screwing. Especially, for screwing as described above, a step provided by the protrusion is effective because an insulating tube on the wiring side of the coil does not become an obstacle.

The invention described in a fourteenth aspect of the application relates to a motor provided with a stator, a rotor and a housing for holding them, wherein a control for supplying a coil of the motor with power is disposed within the housing, the control includes a circuit board on which capacitors are disposed as its power supply, and the capacitors are provided with a support means for securing vibration proofness, and the motor is configured very rationally.

Specifically, because the support means is provided with the capacitors of vibration proofness, a mechanical stress to the connection of the circuit board and the capacitors can be reduced. Assuming that the capacitors are swayed unstably with respect to the circuit board by the vibration of the motor, this causes increase of the mechanical stress. However, with the present invention the mechanical stress can be reduced without fail.

The invention described in a fifteenth aspect of the application relates to the motor according to any one of the first to fourteenth aspects, wherein the motor is a running motor used for vehicles. In other words, the motor of the invention is configured very rationally and can be used suitably as a running motor used for vehicles.

BEST MODE FOR CARRYING OUT THE INVENTION

Figure 1:
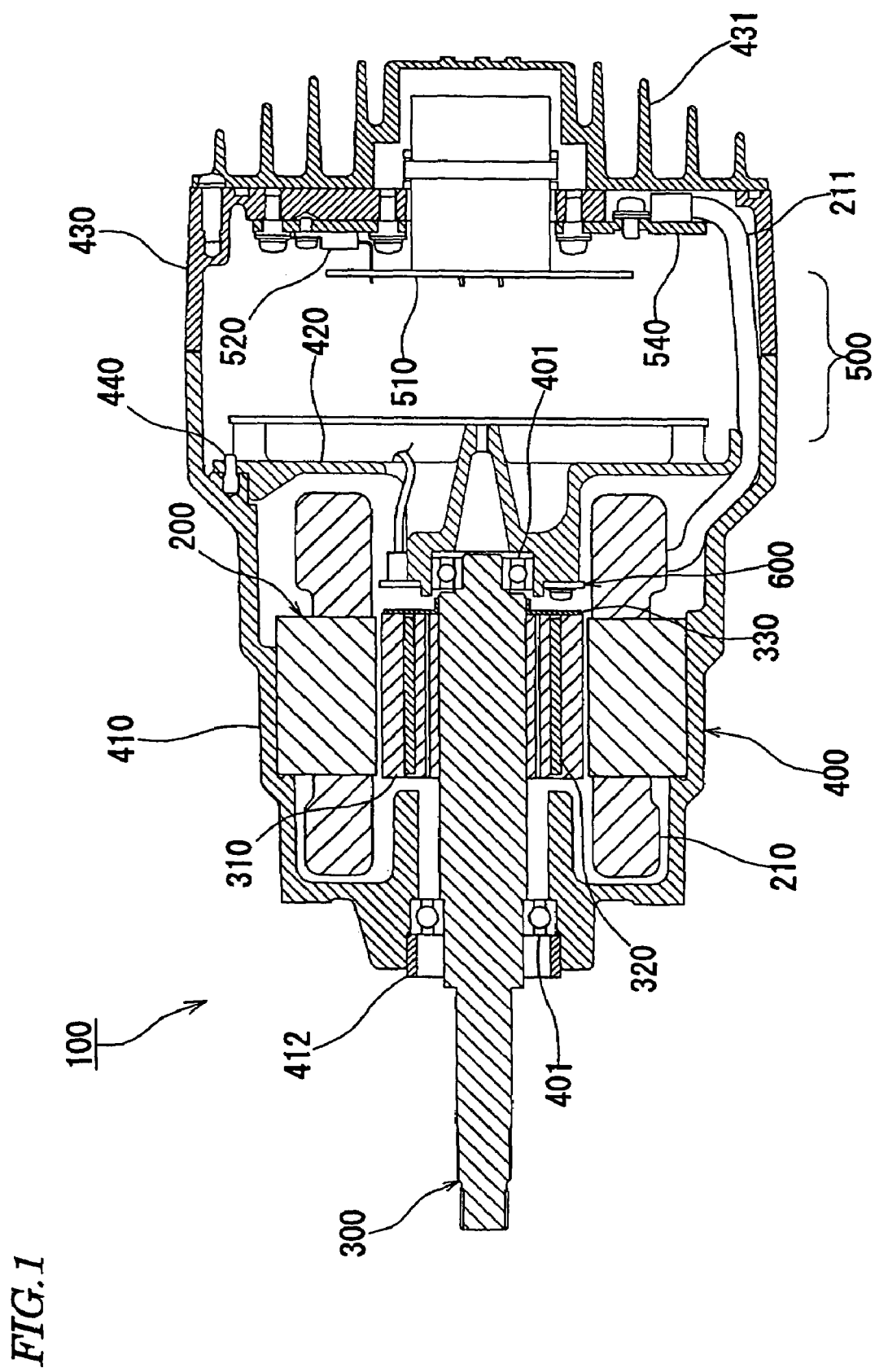
FIG. 1 is an explanatory diagram of a motor according to an embodiment of the invention.

An embodiment of the invention will be described in detail with reference to FIG. 1 to FIG. 23.

A motor 100 of this embodiment is a 3-phase DC brushless motor for running, which is provided with a stator 200, a rotor 300 and a housing 400 for holding them and used for a vehicle drive engine. The housing 400 is configured by assembling a first housing member 410 covering the stator 200 and the rotor 300, a second housing member 420 dividing the inside of the housing and a third housing member 430 covering a control 500, together the first housing member 410, the second housing member 420 and the third housing member 430 are formed by molding an aluminum alloy. The housing 400 also has therein the control 500 for supplying a coil 210 or a stator coil of the motor 100 with power and a sensor 600 for detecting a position of the rotor 300 (see FIG. 1).

Figure 2:
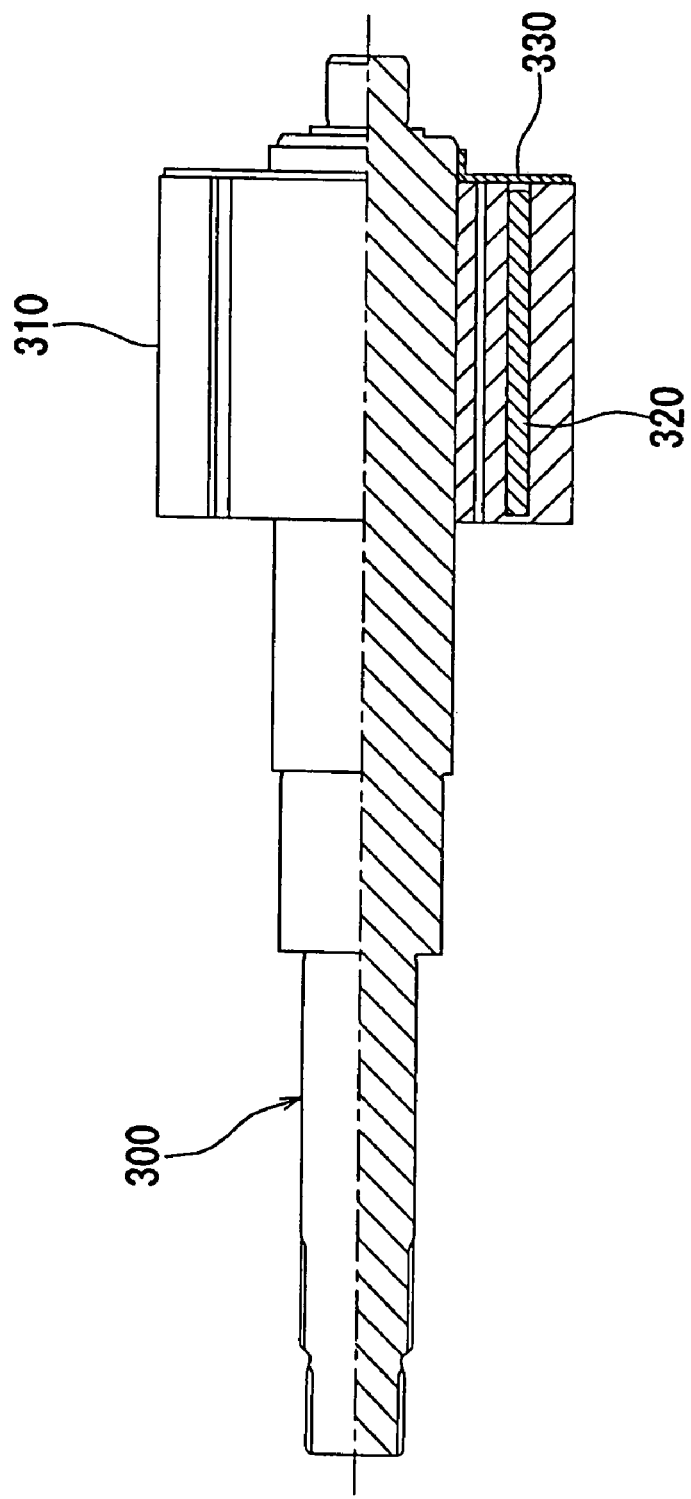
FIG. 2 is an explanatory diagram showing a rotor according to the embodiment of the invention.
Figure 3:
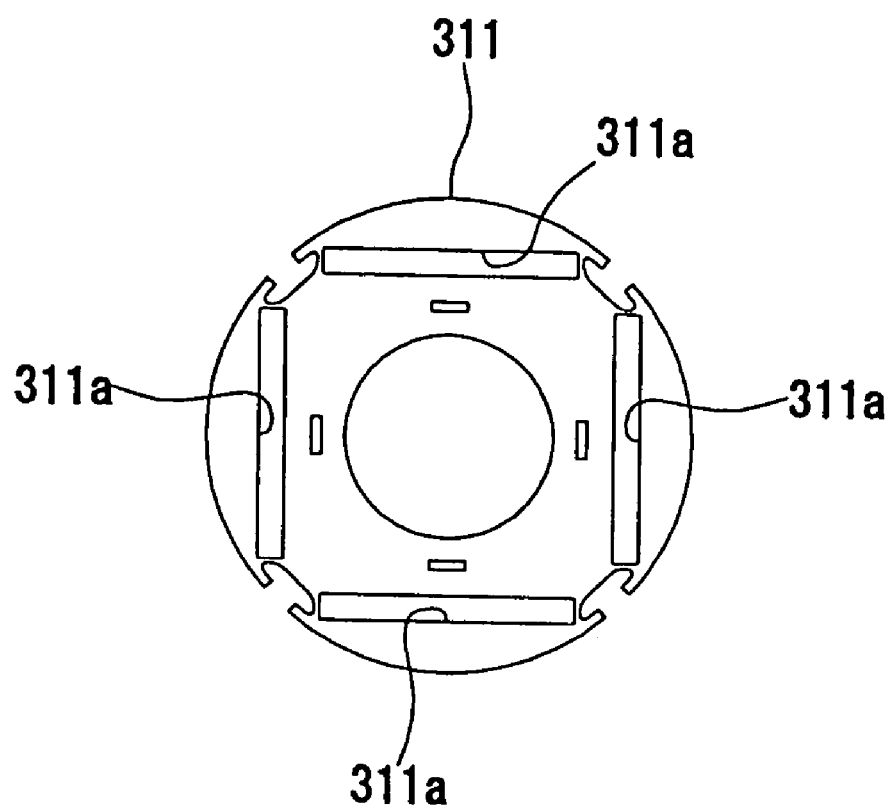
FIG. 3 is an explanatory diagram showing a first steel sheet according to the embodiment of the invention.

The rotor 300 of this embodiment includes a laminated steel sheet 310 into which rotor magnets 320 are inserted and a support member 330 for preventing the rotor magnets 320 from separating from the laminated steel sheet 310 (see FIG. 2).

Figure 4:
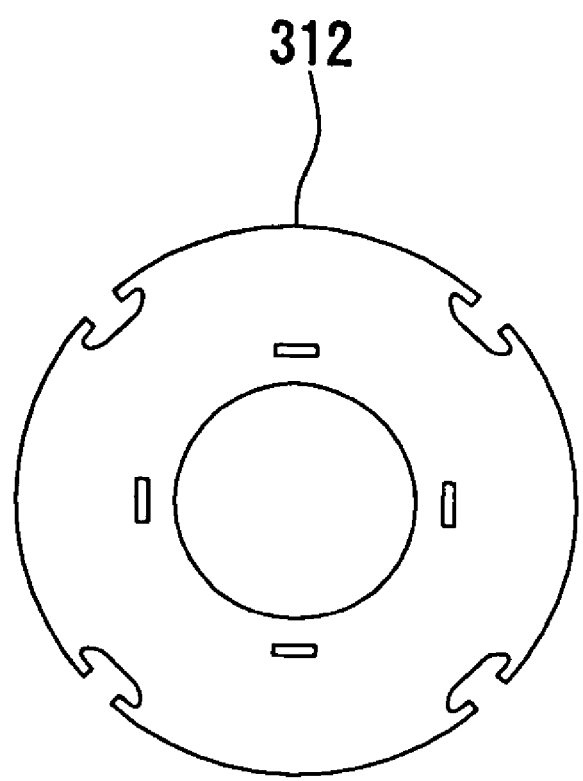
FIG. 4 is an explanatory diagram showing a second steel sheet according to the embodiment of the invention.

The laminated steel sheet 310 includes a plurality of first steel sheets 311 each having slots 311a through which the rotor magnets 320 are inserted (see FIG. 3) and a second steel sheet 312 to which the inserting ends of the rotormagnets 320 are pressed (see FIG. 4). The plurality of first steel sheets 311 and the second steel sheet 312 are configured to have the same contour and laminated with their contours aligned.

Specifically, the laminated steel sheet 310 of this embodiment is formed by laminating a plurality of steel sheets having the same contour, and the steel sheet of one end is the second steel sheet 312 not having the slot 311a. The rotor magnets 320 are held between the second steel sheet 312 and the support member 330.

The first steel sheets 311 and the second steel sheet 312 are produced by stamping using a common mold. A press machine used here is determined to have a first stroke for stamping their contours and a second stroke for boring the slots 311a. The first steel sheets 311 are produced by the first and second strokes, and the second steel sheet 312 is produced by the first stroke only.

Figure 5:
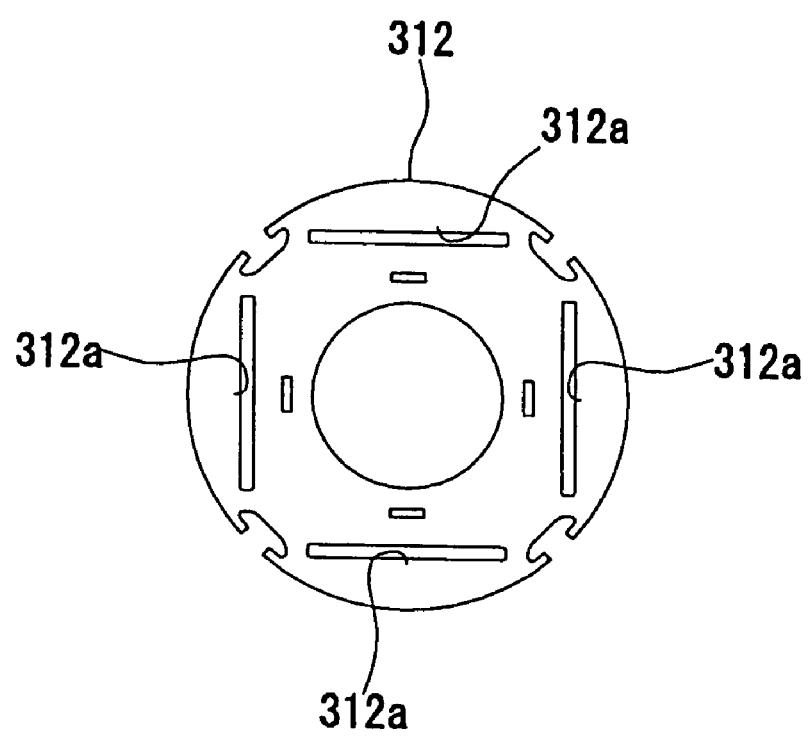
FIG. 5 an explanatory diagram showing the second steel sheet according to the embodiment of the invention.

Considering the leakage or the like of unnecessary magnetism, the second steel sheet 312 may be formed holes 312a in a size through which the rotor magnets 320 cannot be inserted (see FIG. 5).

Figure 6:
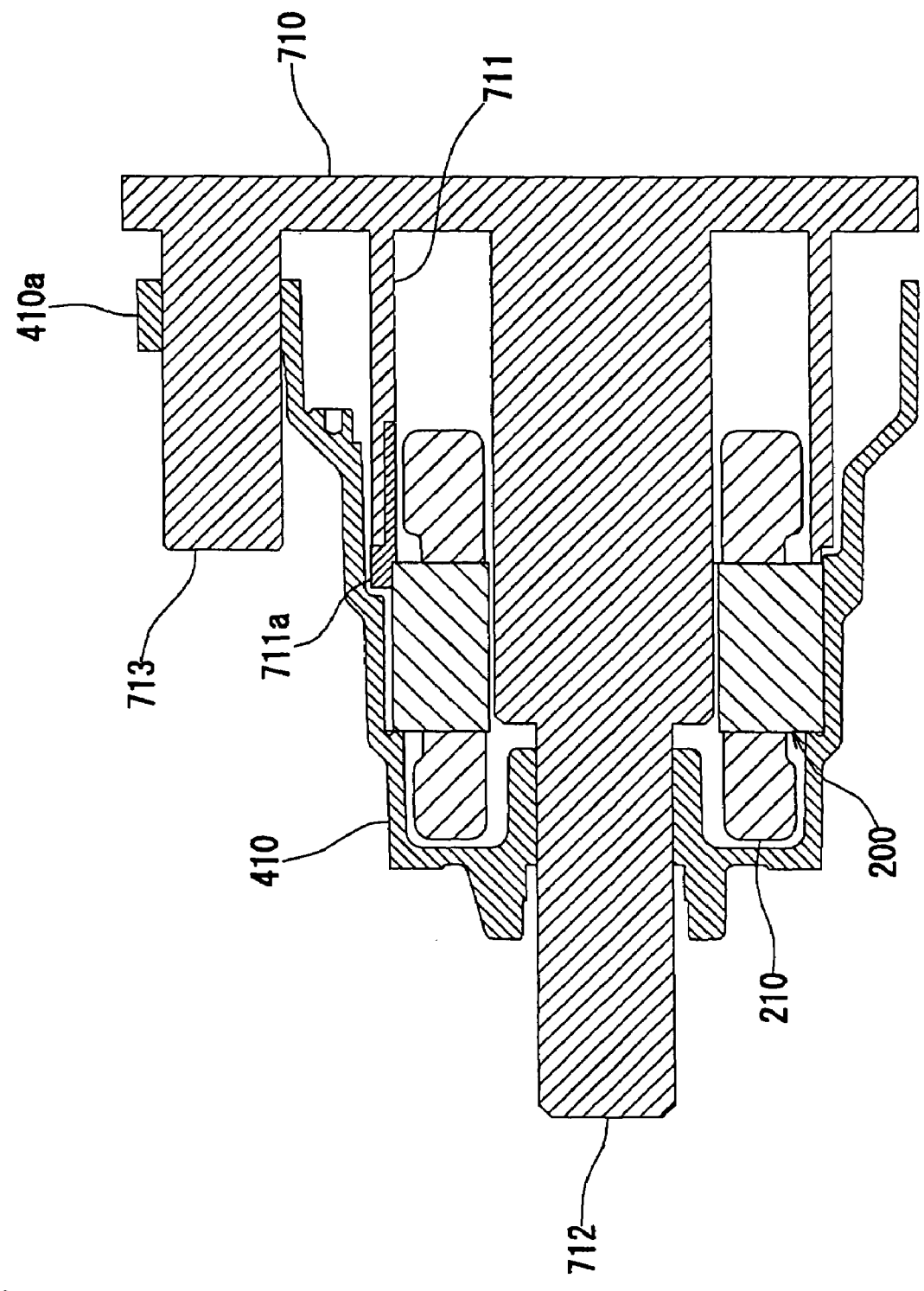
FIG. 6 is an explanatory diagram showing an assembly of a housing and a stator according to the embodiment of the invention.

The stator 200 and the housing 400 are assembled by a jig 710 (see FIG. 6). Specifically, the stator 200 having the coil 210 and the first housing member 410 are shrink-fitted.

The jig 710 used here includes a stator support part 711 for supporting the stator 200 and housing positioning means for positioning the first housing member 410 with respect to the stator 200.

An angle of attaching the stator 200 and the stator support part 711 with respect to the rotation direction of the motor 100 is determined by fitting a pin 711a attached to the stator support part 711 to a recess or the like of the stator 200.

The housing positioning means of this embodiment has a first cylindrical part 712 which is inserted into the center of the first housing member 410 and a second cylindrical part 713 which is inserted through a through hole 410a formed in a relevant portion of the first housing member 410.

The first housing member 410 is positioned by the housing positioning means and assembled by shrink-fitting with the stator 200 supported by the stator support part 711. Thus, the stator 200 and the housing 400 are assembled extremely accurately.

In this embodiment, a bearing 401 for supporting the rotor 300 is disposed on the first housing member 410 and the second housing member 420.

Figure 7:
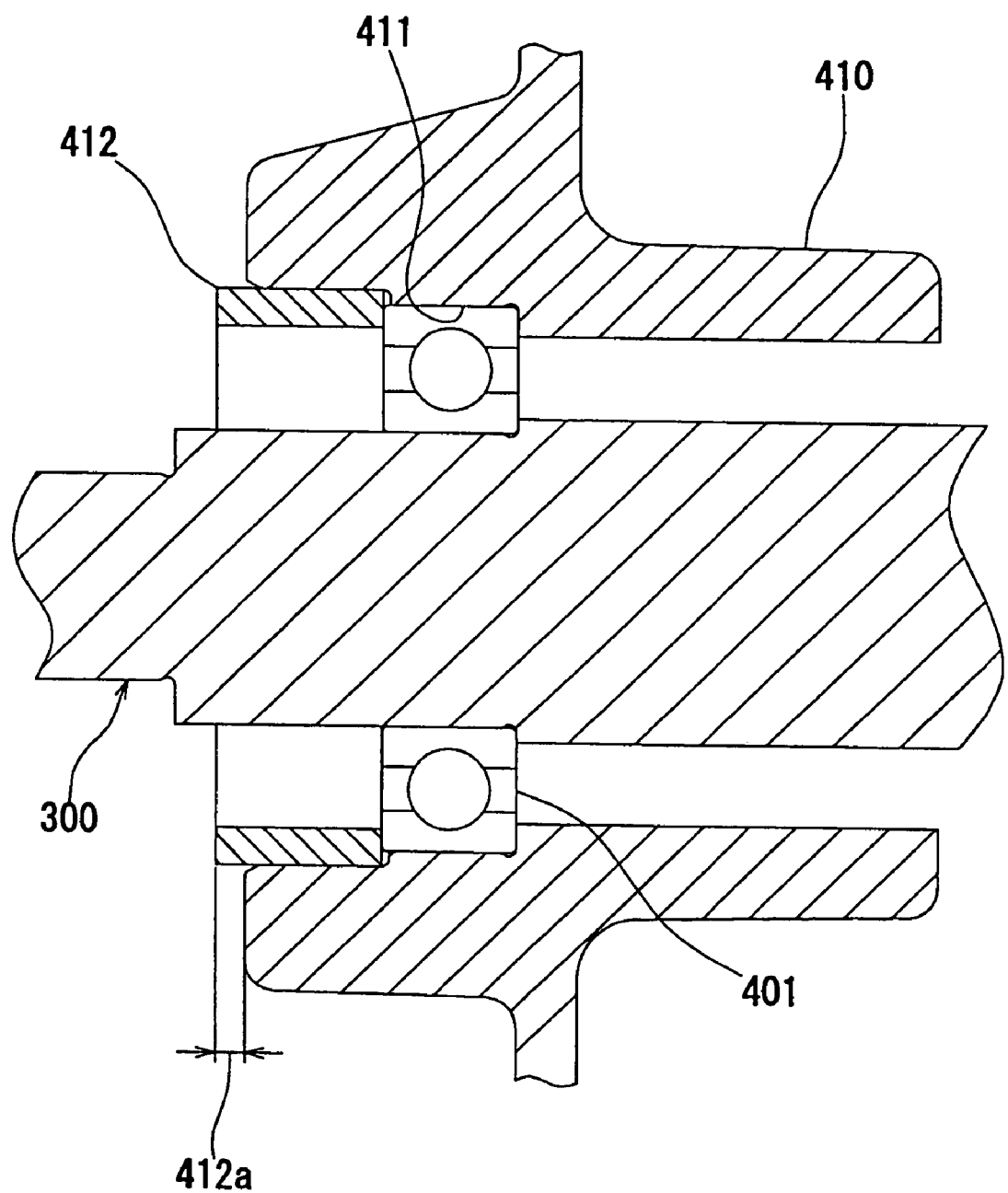
FIG. 7 is an explanatory diagram showing a first housing member and a second housing member according to the embodiment of the invention.
Figure 8:
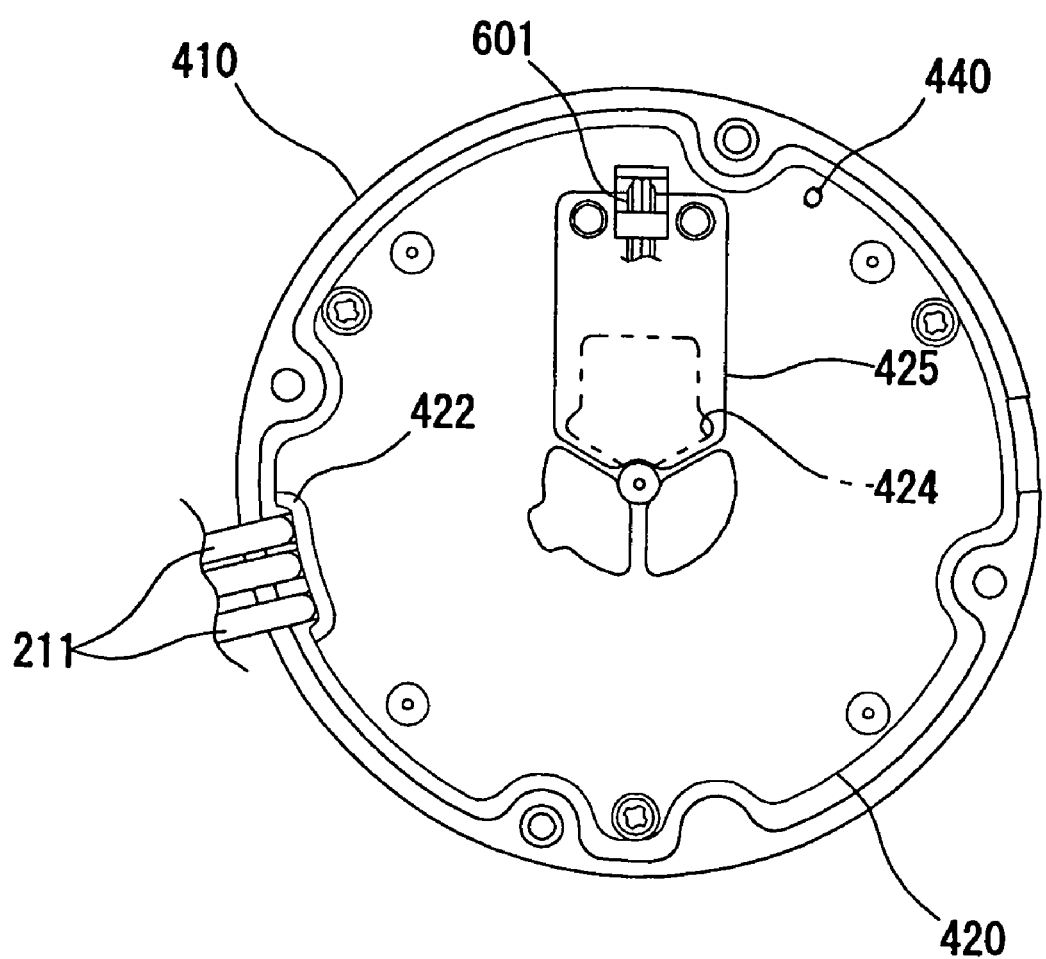
FIG. 8 is an explanatory diagram showing a relevant portion of the motor according to the embodiment of the invention.
Figure 9:
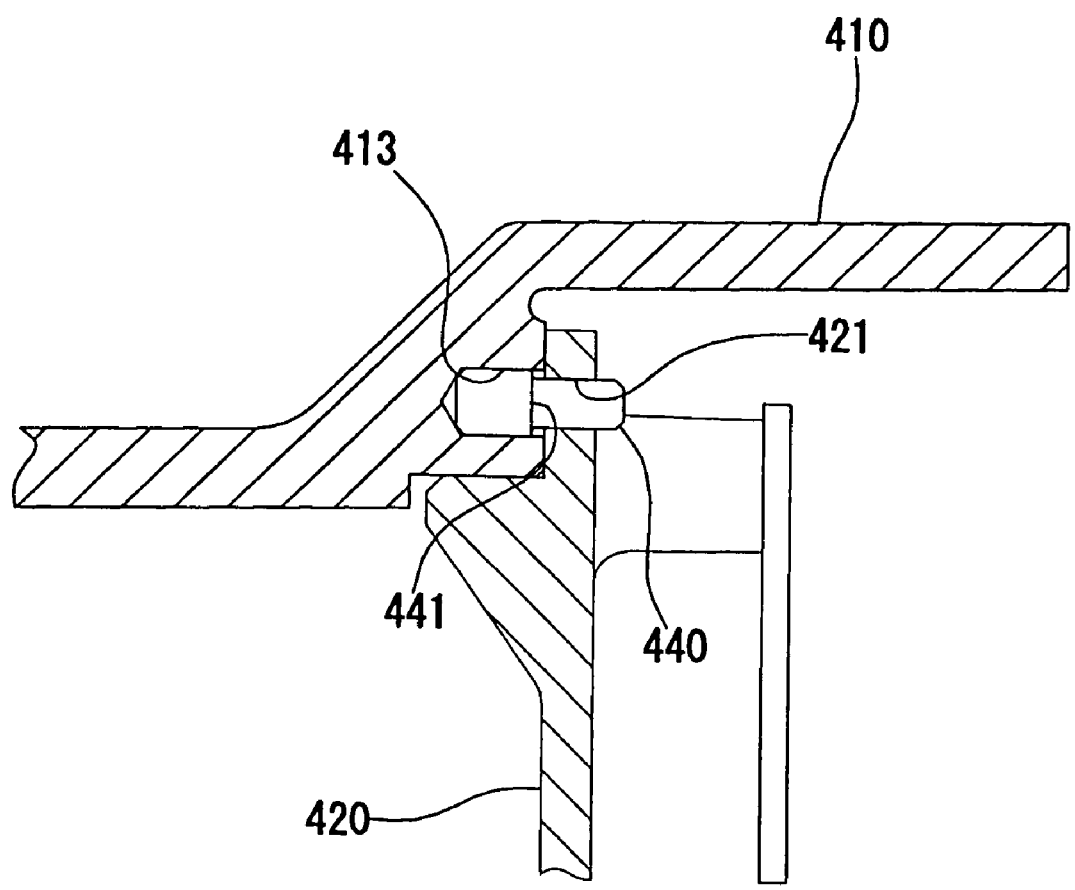
FIG. 9 is an explanatory diagram showing a relevant portion of the motor according to the embodiment of the invention.
Figure 10:
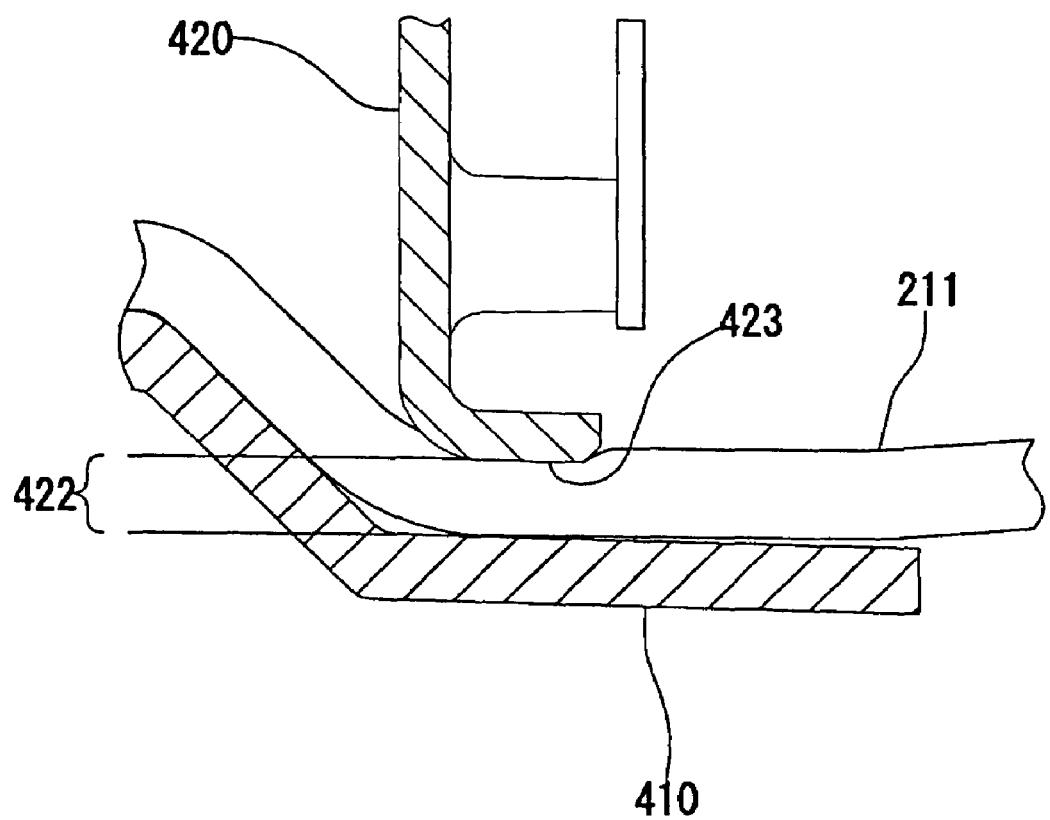
FIG. 10 is an explanatory diagram showing a relevant portion of the motor according to the embodiment of the invention.
Figure 11:
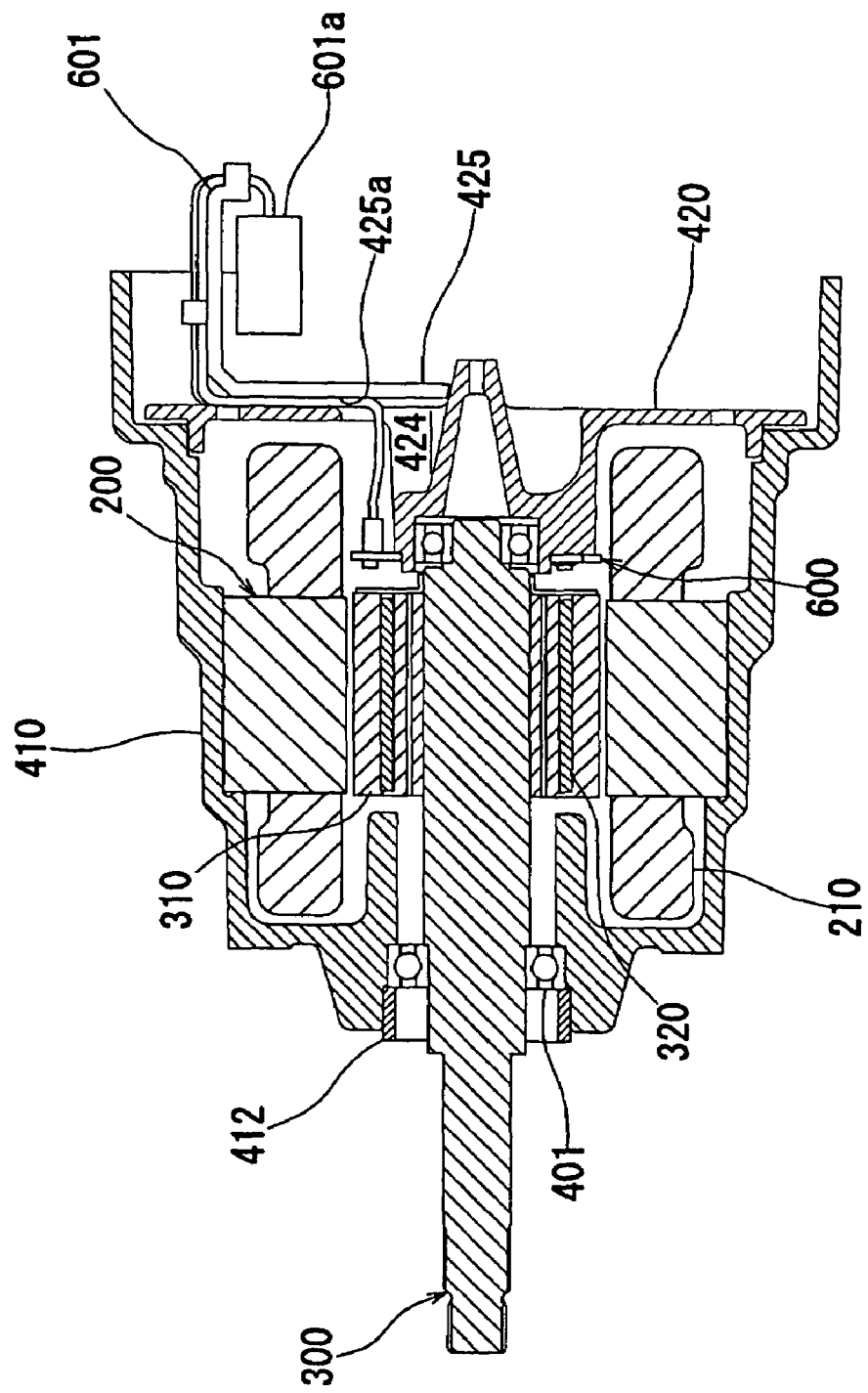
FIG. 11 is an explanatory diagram showing a sensor according to the embodiment of the invention.

The first housing member 410 is formed a recess for fitting the bearing 401, and the bearing 401 is fixed by pressing in a pipe 412 of the same material (namely, an aluminum alloy) as the first housing member 410 into a recess 411 (see FIG. 7). The bearing 401 is held between the bottom of the recess 411 and the inserting end of the pipe 412. The pipe 412 is press-fitted by a press machine or the like. The pipe 412 is an extrusion-molded member.

By configuring as described above, the bearing 401 is fixed accurately and easily. Especially, because the pipe 412 is made of the same material as the first housing member 410, there is no worry that the pipe 412 becomes loose or the like with the thermal expansion by heat generation of the coil 210.

On the other hand, the bearing 401 attached to the second housing member 420 is set to have a small clearance in the axial direction of the rotor 300 with respect to the second housing member 420, and a subtle dimensional difference between the rotor 300 and the housing 400 due to the thermal expansion is remedied by virtue of the clearance.

In this embodiment, an end of the pipe 412 is protruded externally to some extent from the housing 400. And, to couple the vehicle's drive engine to the motor 100, a protruded part 412a of the pipe 412 is used as drive unit positioning means.

The first housing member 410 and the second housing member 420 are positioned by a pin 440 and assembled. More specifically, the first housing member 410 is formed a recess 413 in which the pin 440 is inserted, and the second housing member 420 is formed a hole 421 through which the pin 440 is inserted. The second housing member 420 is assembled by screwing to the first housing member 410 by inserting the pin 440 into the first housing member 420 and fitting the hole 421 to the pin 440. And, the pin 440 has a shoulder 441 at its middle for preventing from coming out of the hole 421 (see FIG. 8 and FIG. 9).

Besides, a through portion 422, through which a wiring 211 of the coil 210 is inserted, is provided between the inner surface of the first housing member 410 and the second housing member 420. The through portion 422 is formed like a notched part by forming a recess on the side of the second housing member 410. The second housing member 420 has a holding surface 423 for holding the wiring 211 of the coil 210 along the inner surface of the first housing member 410 to reduce a mechanical stress applied to the wiring 211 of the coil 210 (see FIG. 8 and FIG. 10).

The second housing member 420 is also provided with a through portion 424 for passage of a wiring 601 of the sensor 600 and a shielding member 425 for shielding the through portion 424 while allowing the passage of the wiring 601 of the sensor 600. The shielding member 425 is a member detachably attached to the second housing member 420 and has a holding surface 425a for holding the wiring 601 of the sensor 600 along the side of the second housing member 420 to reduce a mechanical stress applied to the wiring 601 of the sensor 600. A connector 601a for external connection is disposed on a leading end of the wiring 601 of the sensor 600 and supported by the shielding member 425 at a pertinent part within the housing 400 (see FIG. 8 and FIG. 11).

Besides, the sensor 600 of this embodiment has a plurality of Hall elements disposed on a circular substrate 610 and detects a position of the rotor 300 based on the Hall effect. The substrate 610 is supported by the second housing member 420. An encoder magnet acting on the Hall elements is disposed on a member for supporting the rotor 300.

The substrate 610 has a plurality of terminals 620 for connecting the Hall elements, and the sensor can support both CW and CCW for the rotation direction of the rotor 300 by selecting an arrangement pattern of the Hall elements. In other words, the Hall elements are connected by selecting prescribed terminals 620 and soldering to them (see FIG. 12).

Figure 12:
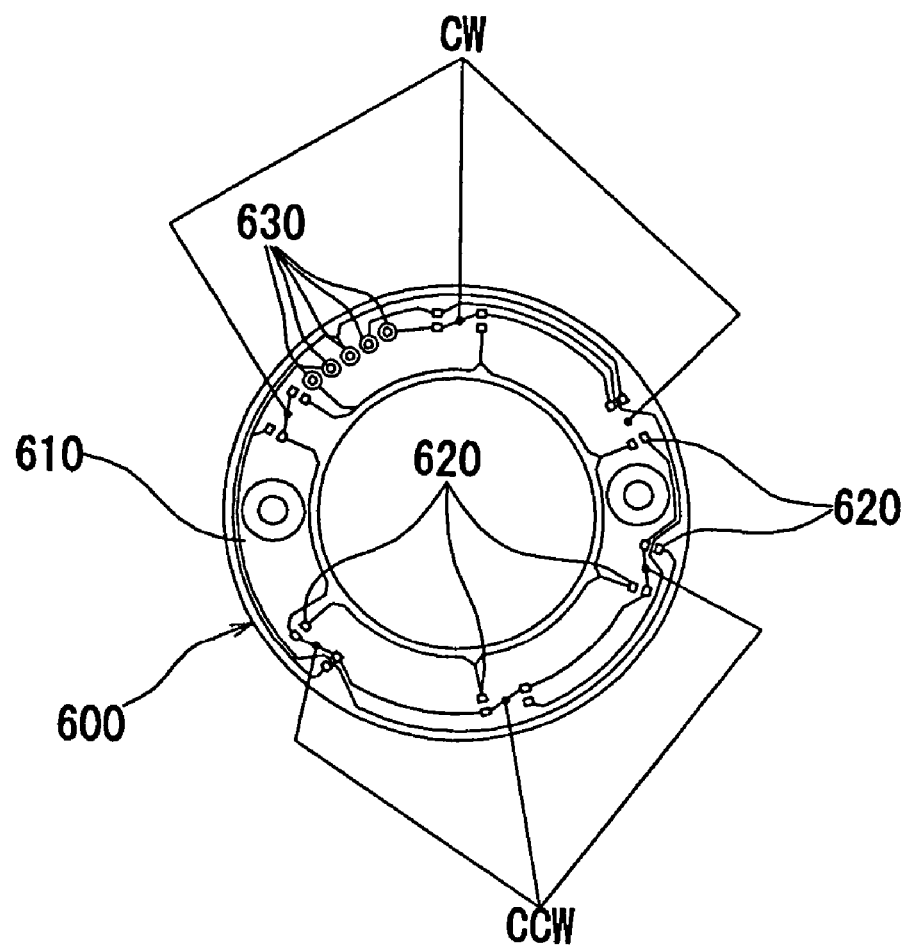
FIG. 12 is an explanatory diagram showing a relevant portion of the motor according to the embodiment of the invention.
Figure 13:
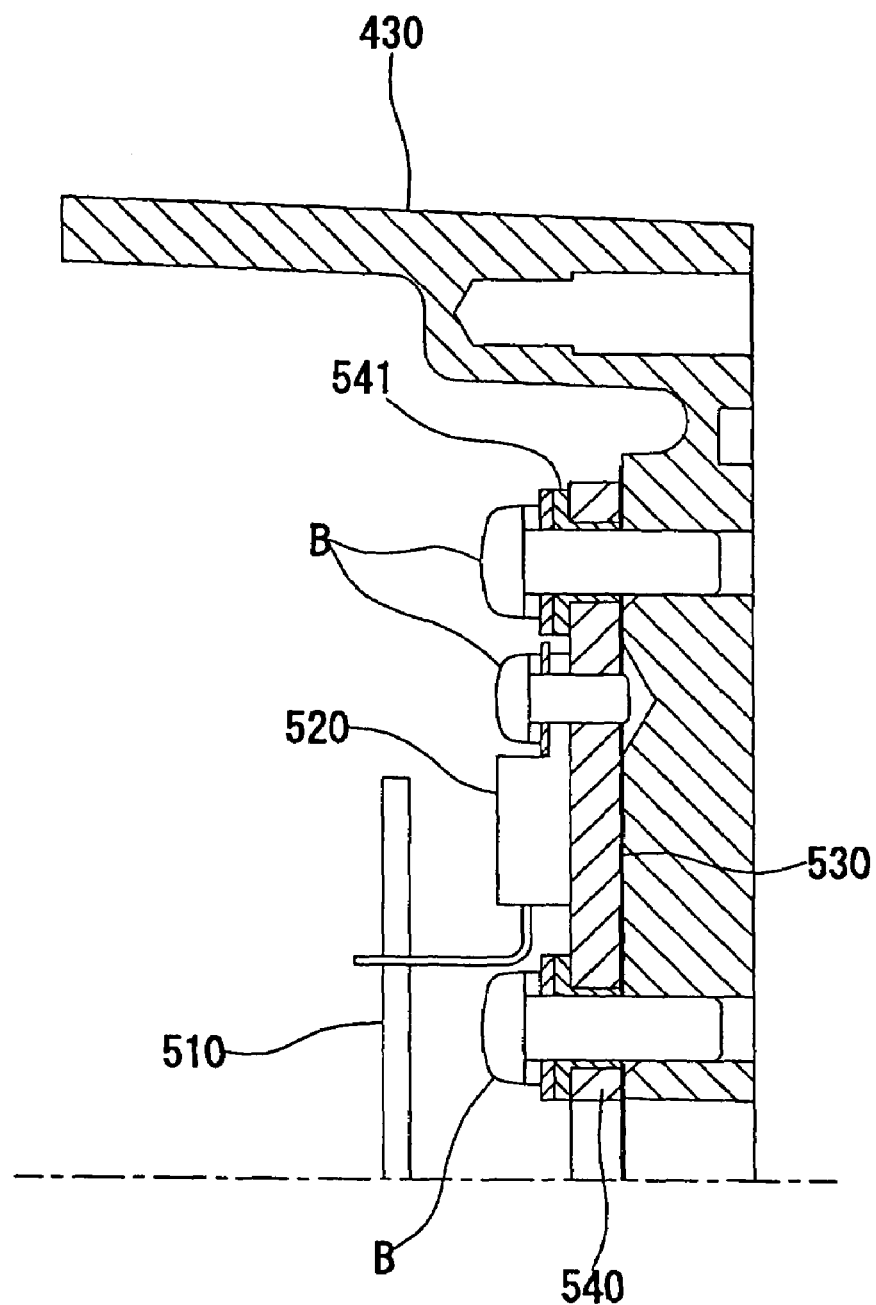
FIG. 13 is an explanatory diagram showing a relevant portion of the motor according to the embodiment of the invention.
Figure 14:
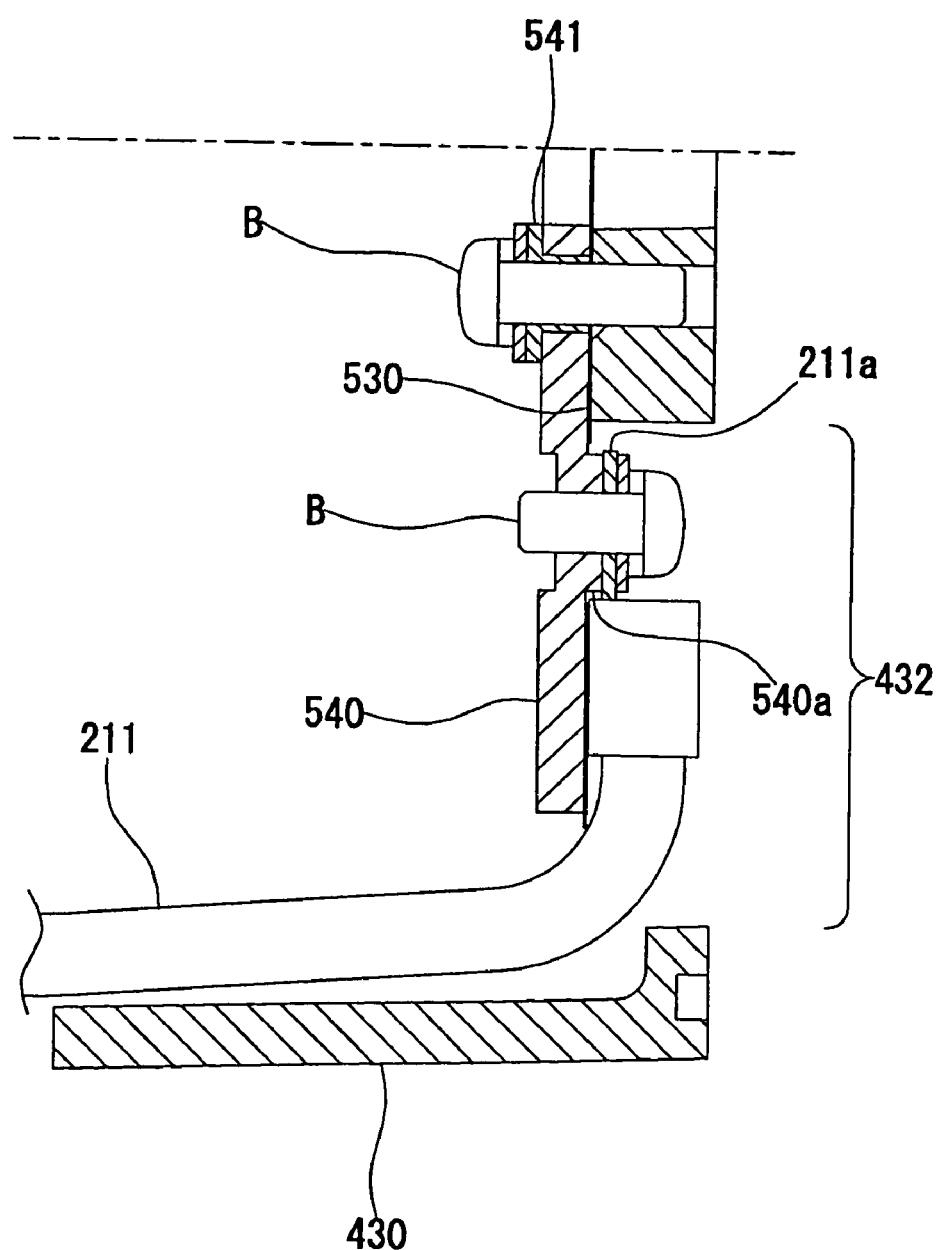
FIG. 14 is an explanatory diagram showing a relevant portion of the motor according to the embodiment of the invention.
Figure 15:
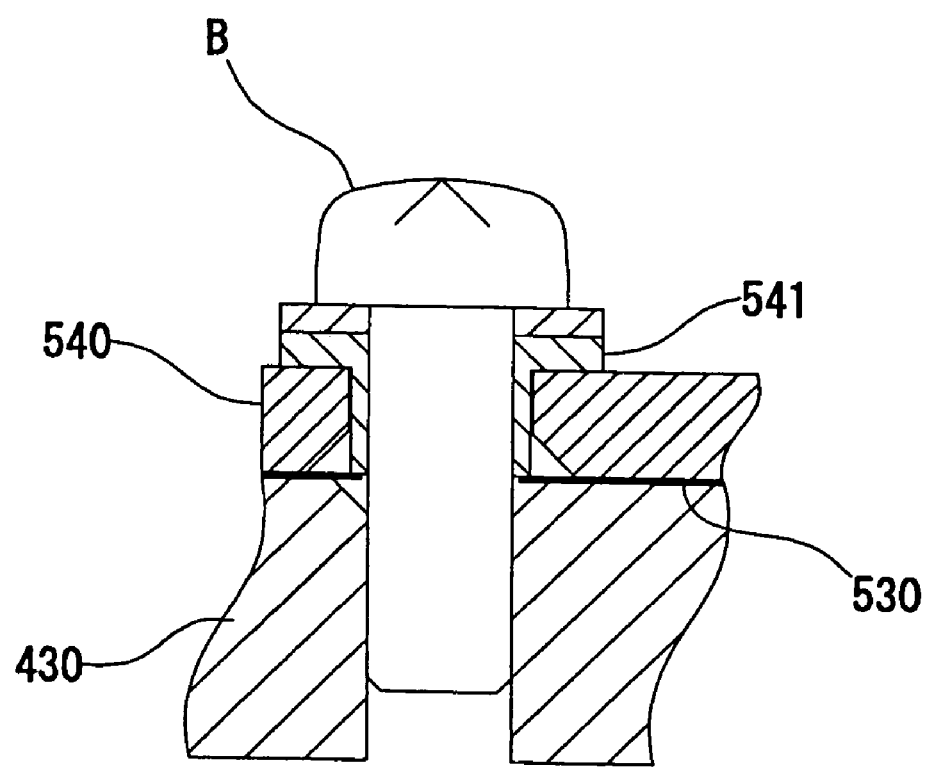
FIG. 15 is an explanatory diagram showing a relevant portion of the motor according to the embodiment of the invention.
Figure 16:
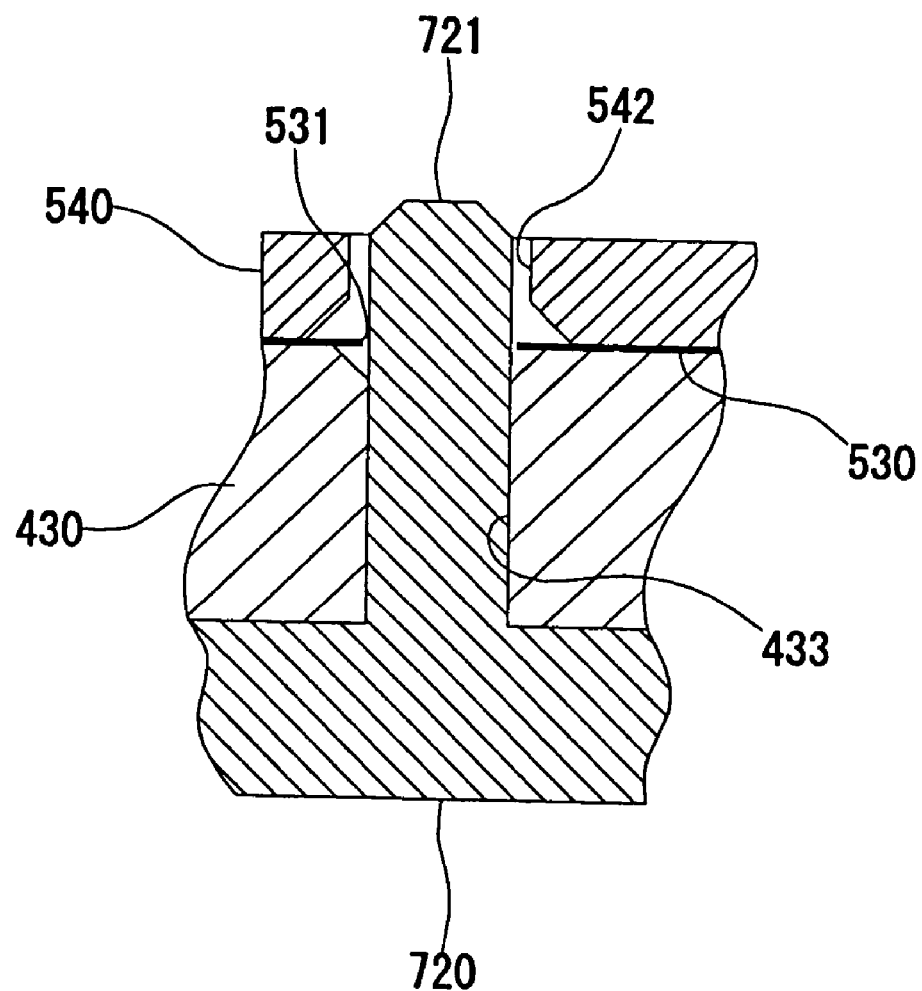
FIG. 16 is an explanatory diagram showing an assembly of a third housing member, an insulating sheet and a radiator according to the embodiment of the invention.

FIG. 12 shows positions where the Hall elements are disposed for CW and CCW. In the drawing, 630 denotes terminals to which the wiring 601 of the sensor 600 is connected.

The control 500 has a circuit board 510 a plurality of switching elements 520 for switching power distribution to the coil 210. The individual switching elements 520 are connected to the circuit board 510 and also fixed to a plurality of radiators 540 which are fixed to the third housing member 430 via an insulating sheet 530 (see FIG. 13, FIG. 14 and FIG. 15).

Fixing between the switching elements 520 and the radiators 540 and between the radiators 540 and the third housing member 430 is made with bolts B.

The bolts B for screwing the radiators 540 and the third housing member 430 are inserted through insulating cylindrical bosses 541 attached to the radiators 540.

The radiators 540 are conductive members and used as a power supply terminal for supplying the coil 210 with power.

And, the insulating sheet 530 protrudes to some extent from the opposed surfaces of the radiators 540 and the third housing member 430 because their pertinent portions are chamfered, so that the leakage of current between the radiators 540 and the housing 400 is prevented efficiently.

Besides, a crimp terminal 211a to be screwed to the radiator 540 is disposed for the wiring 211 of the coil 210, and a protruded part 540a for screwing the crimp terminal 211a is disposed for the radiator 540. The protruded part 540a is formed by embossing.

The housing 400 is assembled by supporting the control 500 by the third housing member 430 and supporting it by the first housing member 410.

Here, the third housing member 430 has an opening 432 for exposing the radiator 540 as the power supply terminal and a lid 431 for shielding the opening 432. The wiring 211 of the coil 210 is connected to the radiator 540 by manipulating through the opening 432 after the third housing member 430 is supported by the first housing member 410 and the second housing member 420. The lid 431 is also screwed to the third housing member 430. And, an O-ring is disposed between the third housing member 430 and the lid.

Especially, the lid 431 of this embodiment is a member with fins, and the heat radiation property of the third housing member 430 is improved by attaching the lid 431.

The third housing member 430, the insulating sheet 530 and the radiator 540 are assembled using a jig 720 and screwed. The jig 720 has a plurality of pins 721, and the third housing member 430, the insulating sheet 530 and the radiator 540 have guides in a hole form for guiding the pins 721 (see FIG. 16).

Figure 17:
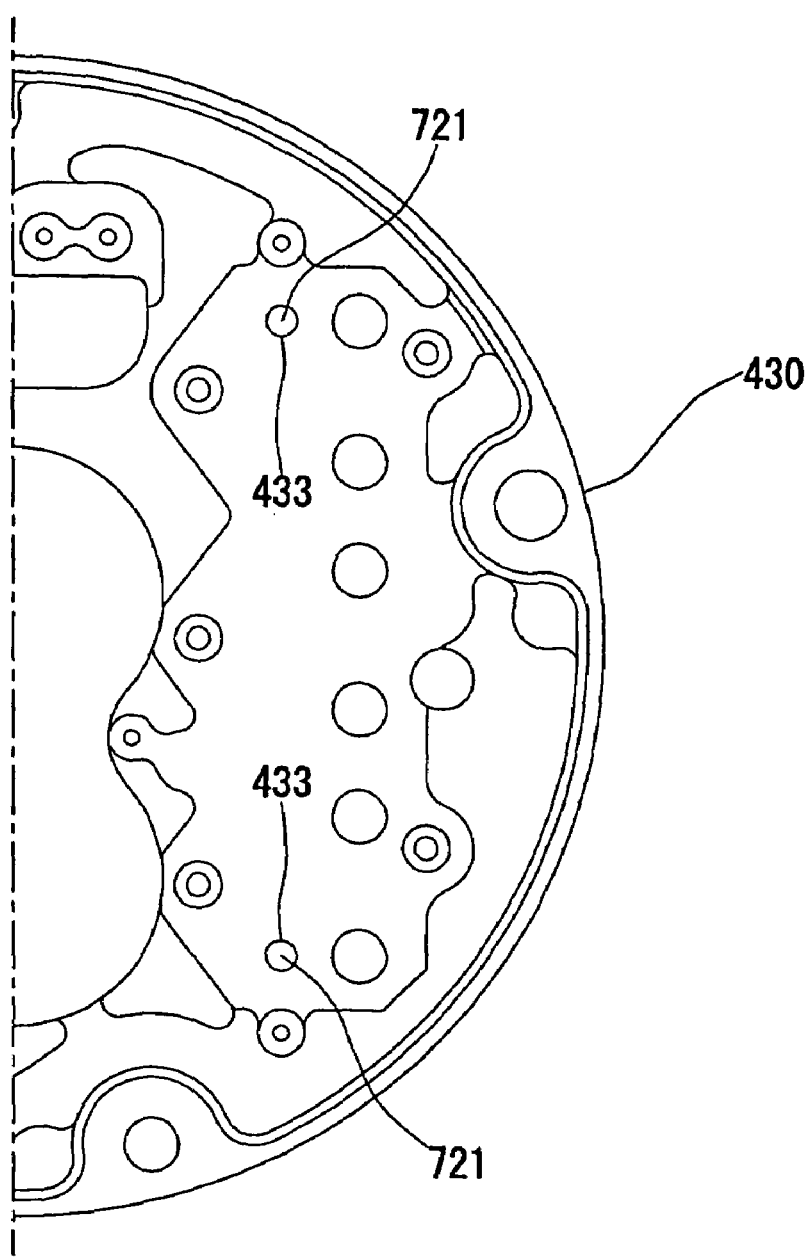
FIG. 17 is an explanatory diagram showing an assembly of the third housing member, the insulating sheet and the radiator according to the embodiment of the invention.
Figure 18:
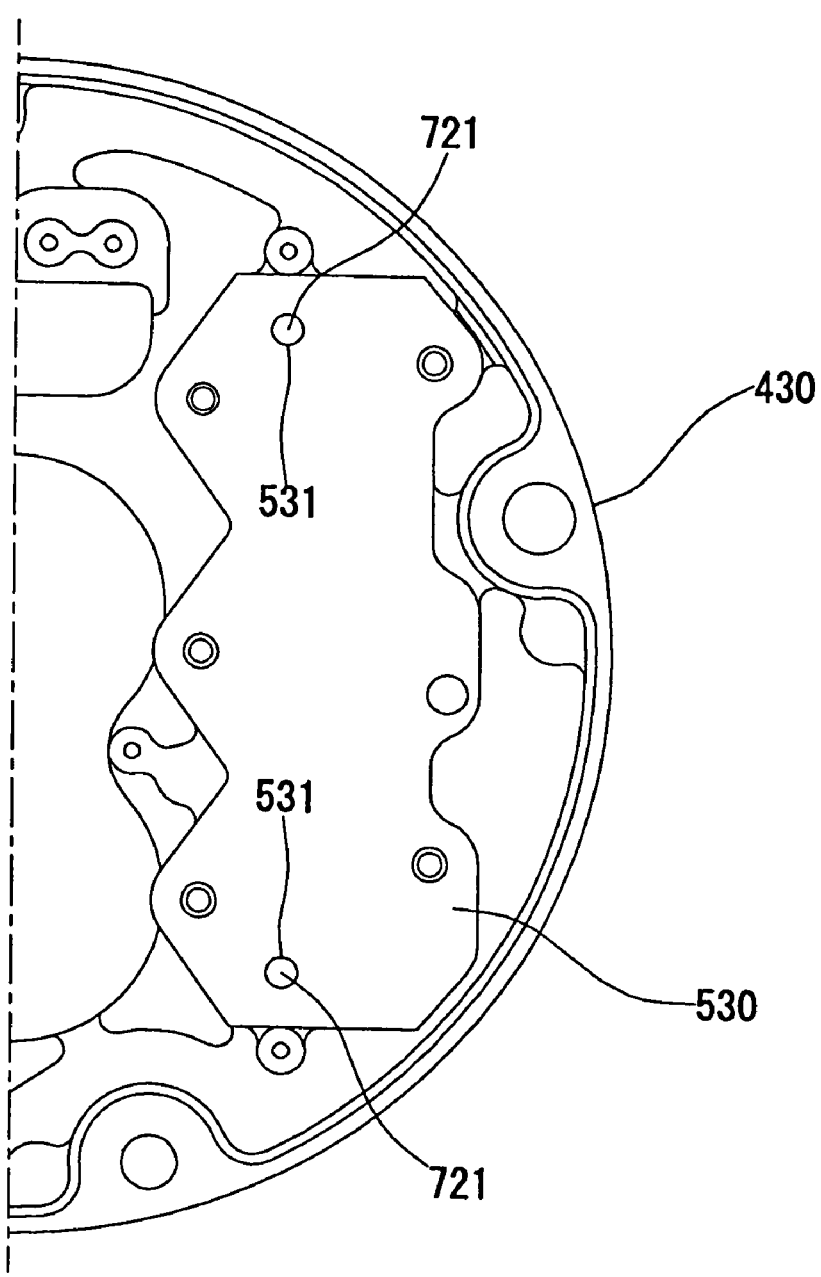
FIG. 18 is an explanatory diagram showing an assembly of the third housing member, the insulating sheet and the radiator according to the embodiment of the invention.
Figure 19:
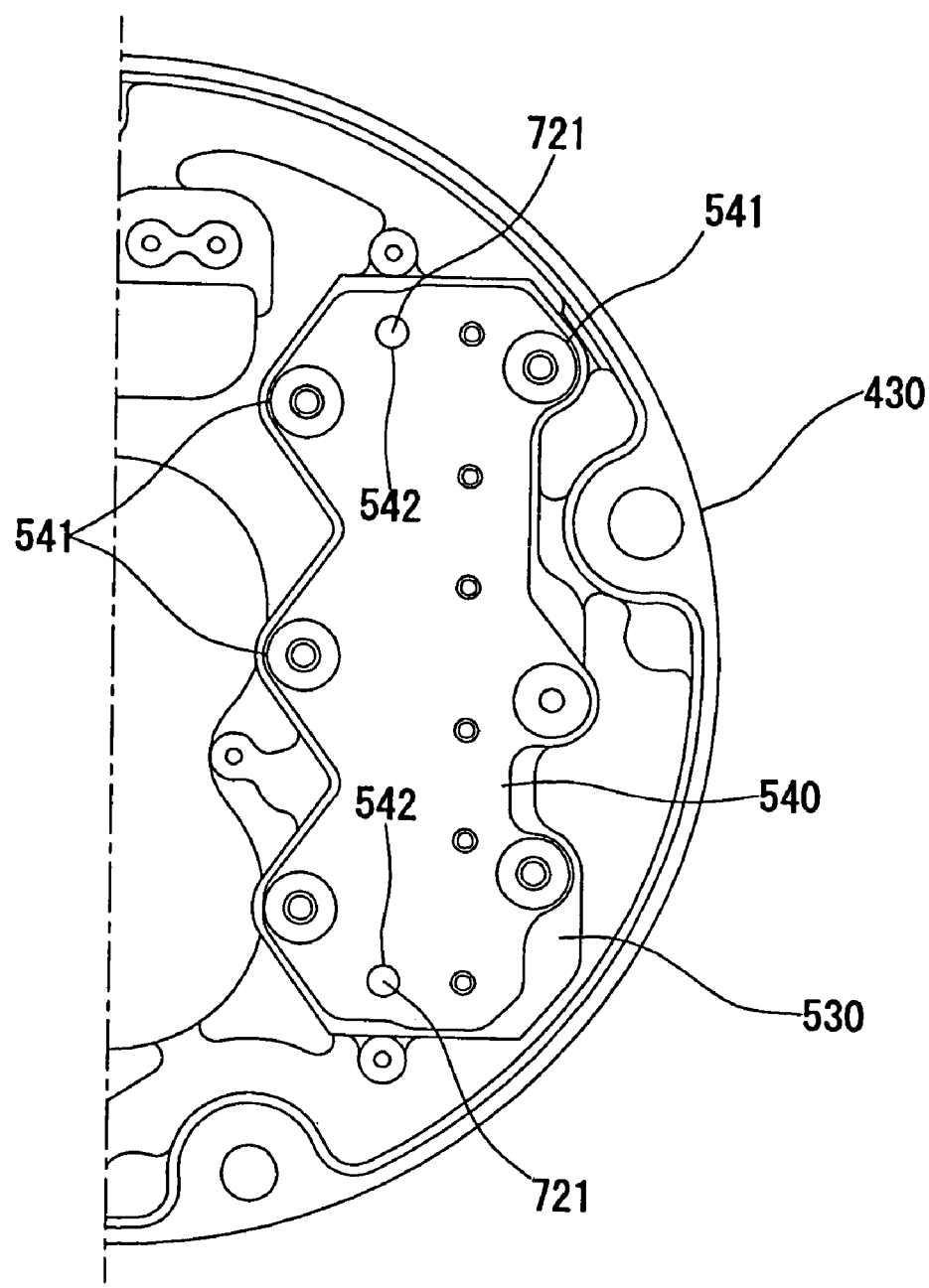
FIG. 19 is an explanatory diagram showing an assembly of the third housing member, the insulating sheet and the radiator according to the embodiment of the invention.
Figure 20:
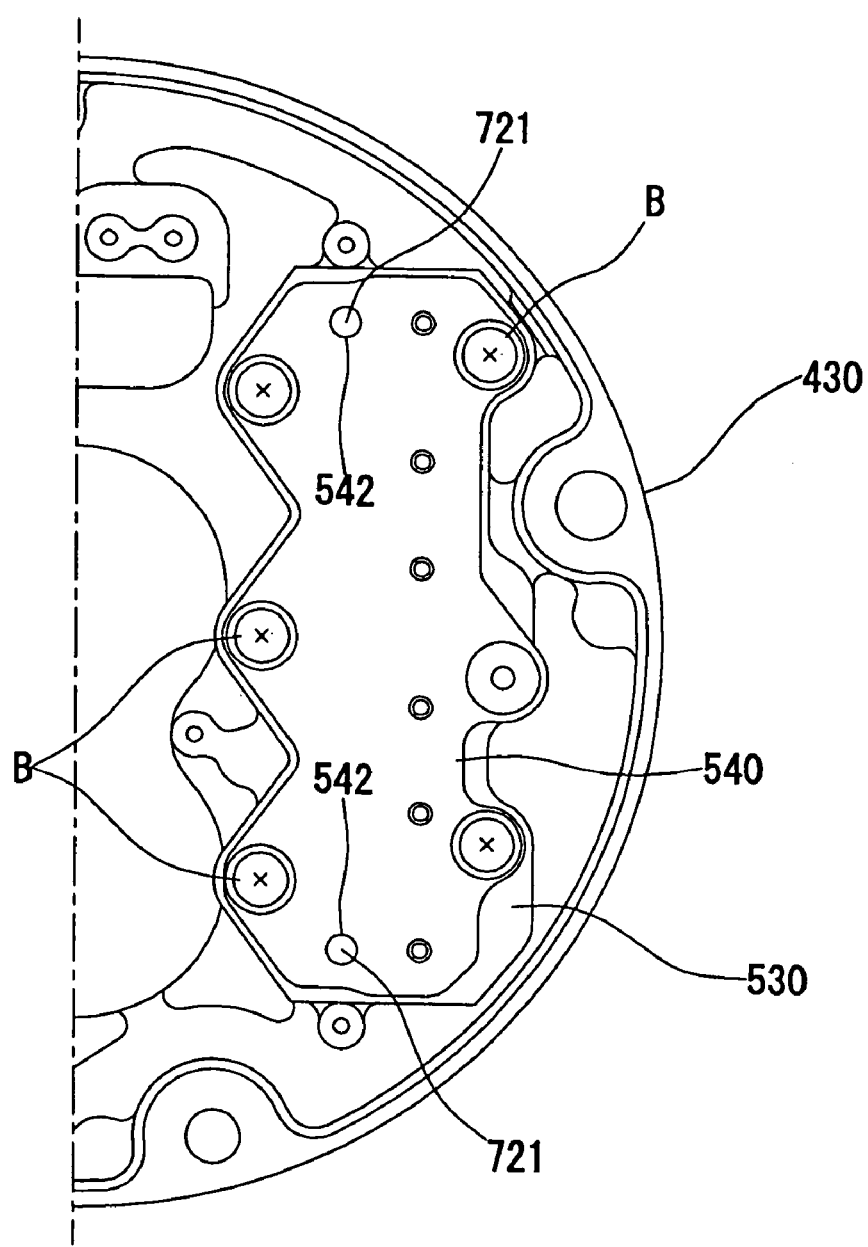
FIG. 20 is an explanatory diagram showing an assembly of the third housing member, the insulating sheet and the radiator according to the embodiment of the invention.
Figure 21:
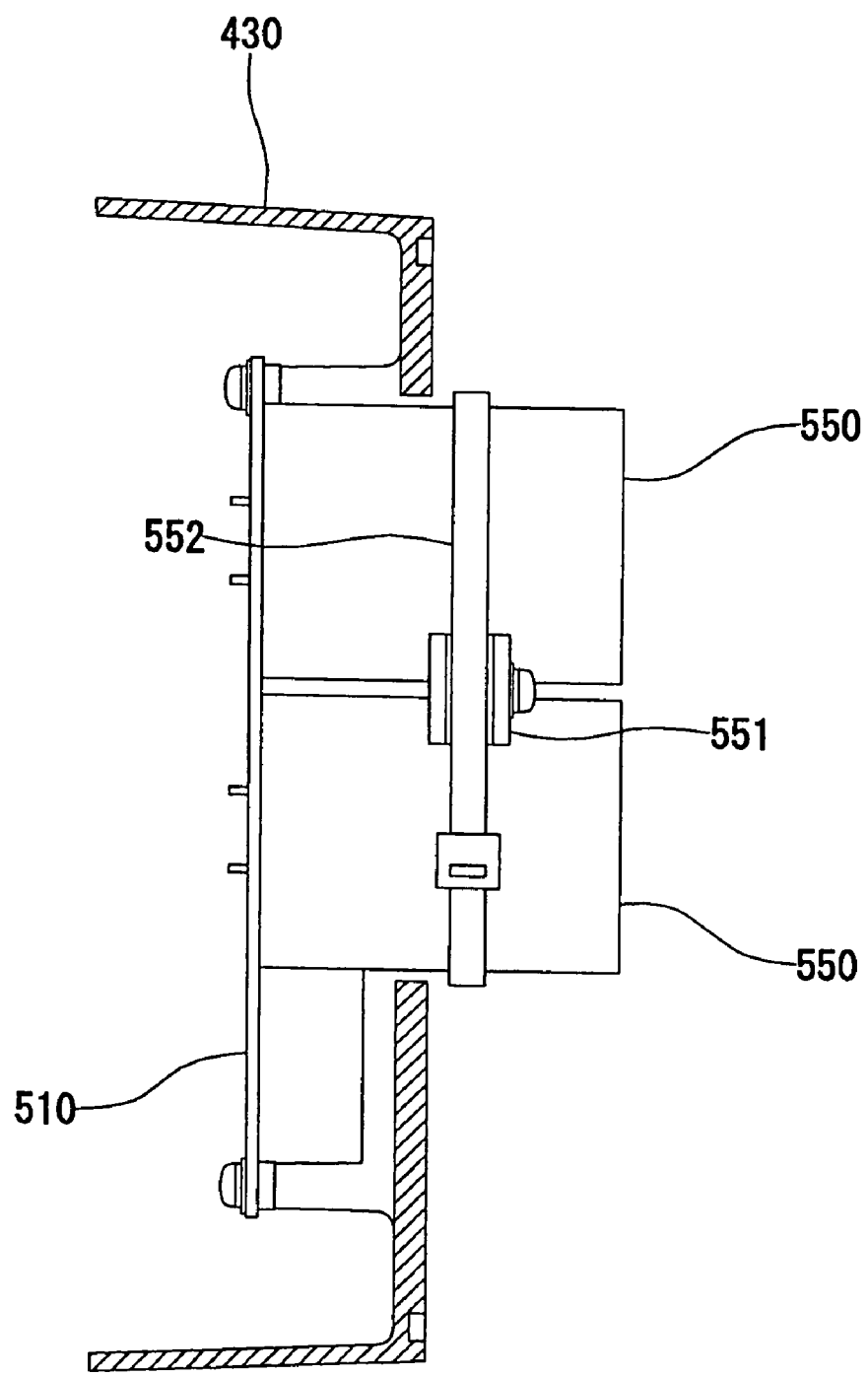
FIG. 21 is an explanatory diagram showing a relevant portion of the motor according to the embodiment of the invention.
Figure 22:
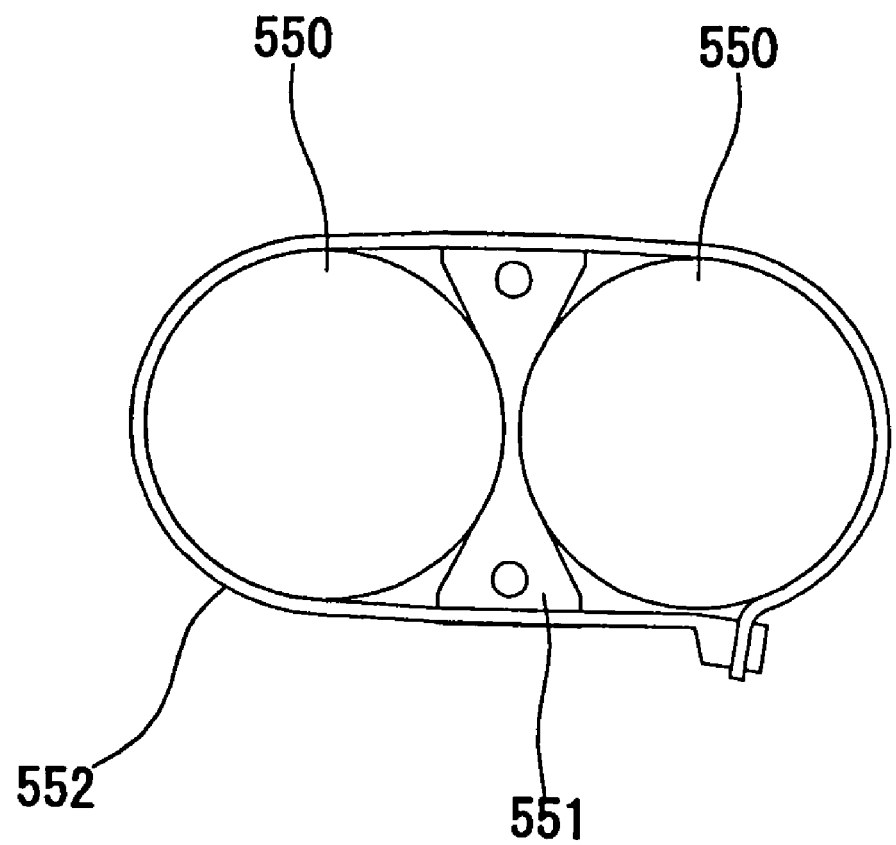
FIG. 22 is an explanatory diagram showing a relevant portion of the motor according to the embodiment of the invention.
Figure 23:
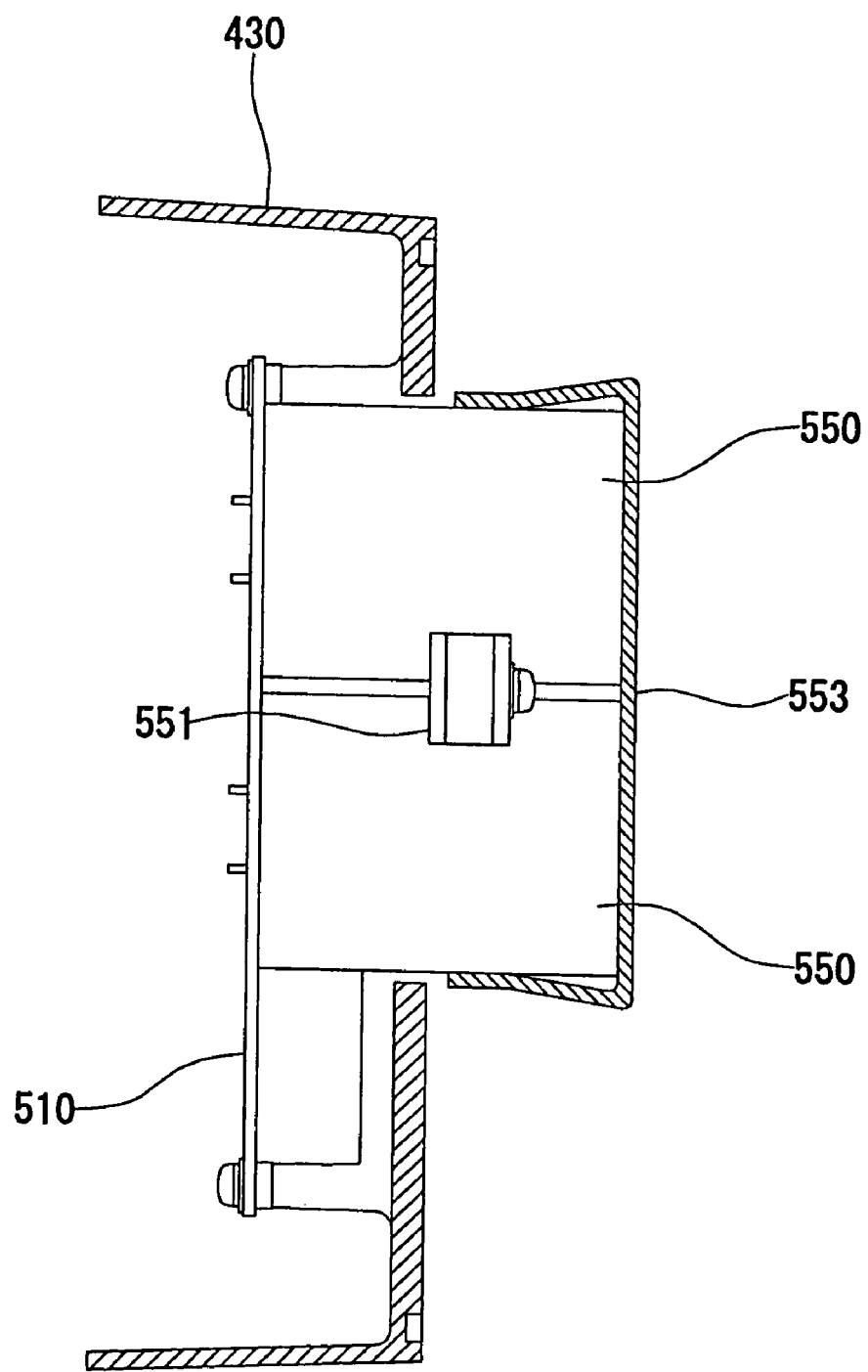
FIG. 23 is an explanatory diagram showing a relevant portion of the motor according to the embodiment of the invention.

To assemble them, the pins 721 are inserted through guides 433 of the third housing member 430 (see FIG. 17). Then, the pins 721 are inserted through guides 531 of the insulating sheet 530 (see FIG. 18). And, the pins 721 are inserted through guides 542 of the radiator 540, cylindrical bosses 541 are disposed on the radiator 540 (see FIG. 19), and the bolts B are used for screwing (see FIG. 20).

A plurality of capacitors 550 to be the power supply for the motor 100 are placed on the circuit board 510 of the control 500. The capacitors 550 are provided with a support means for securing vibration proofness. The support means is comprised of a spacer 551, which is externally fitted to the capacitors 550, and a binding band 552 for tightening the capacitors 550 and the spacer 551. In this embodiment, the spacer 551 and the binding band 552 are made of an insulator. And, the binding band 552 is an elastic band (see FIG. 21 and FIG. 22).

Otherwise, the support means may be configured of the spacer 551, which is externally fitted to the capacitors 550, and a holder 553 for covering the capacitors 550 and the spacer 551. The illustrated holder 553 is a cap-like member of an insulator having elasticity (see FIG. 23).

By using the above support means, it is possible to reduce a mechanical stress applied to the connection between the circuit board 510 and the capacitors 550.

As described above, the motor of this embodiment has special consideration given to the configuration of its various portions and the improvement of its performance and productivity achieved in order to obtain a more remarkable running motor.

Then, a second embodiment of the present invention will be described with reference to FIG. 24 and FIG. 25.

Figure 24:
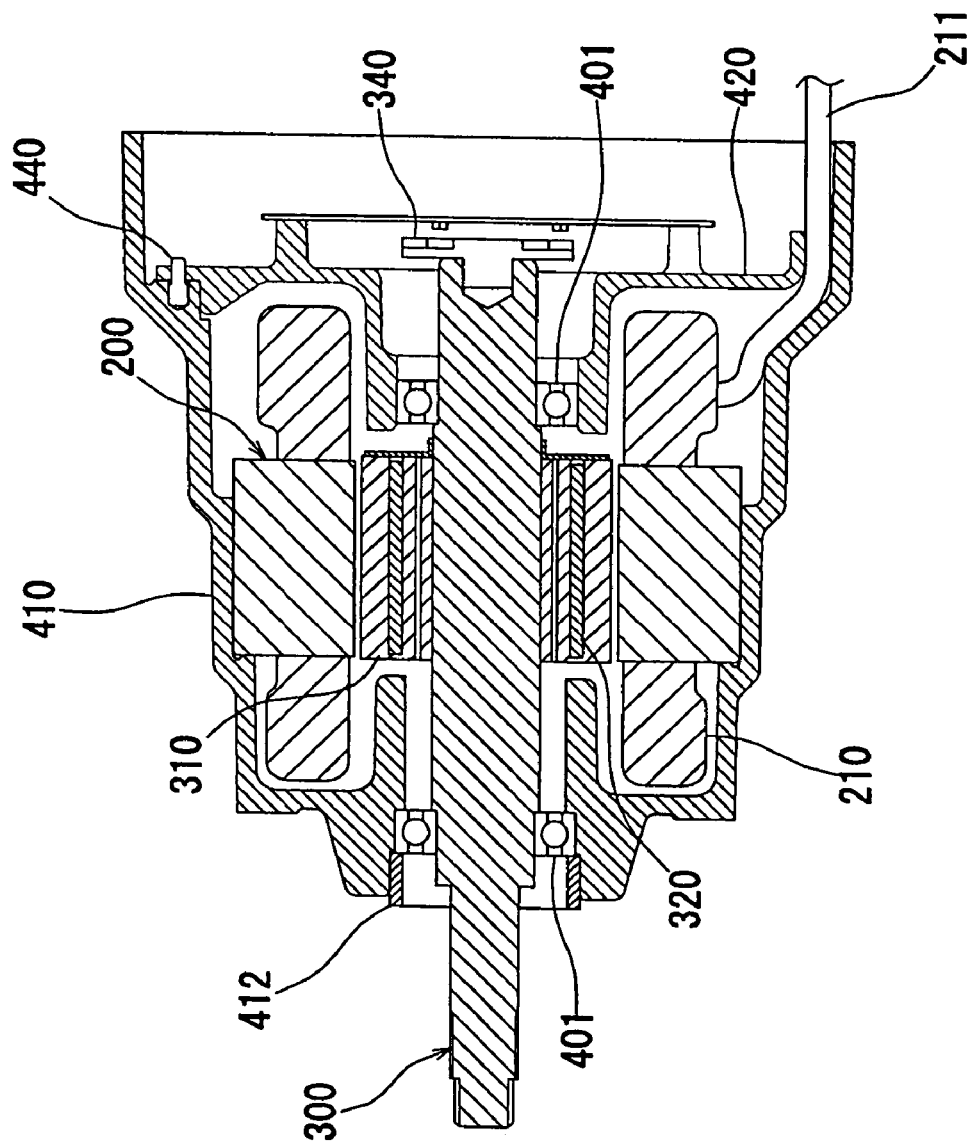
FIG. 24 is an explanatory diagram showing a relevant portion of the motor according to an embodiment of the invention.
Figure 25:
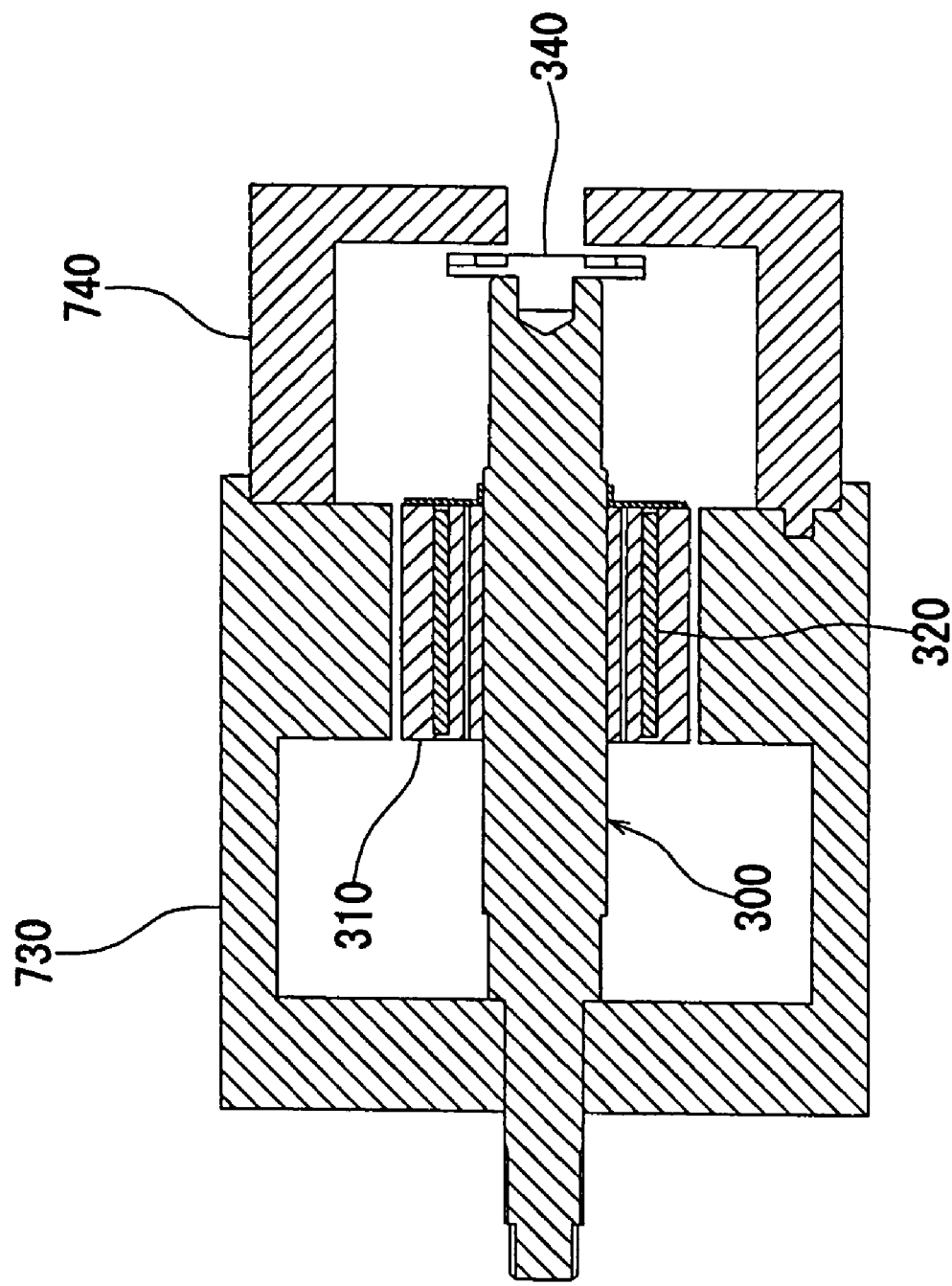
FIG. 25 is an explanatory diagram showing polarization of rotor magnets and an encoder magnet according to the embodiment of the invention.

In this embodiment, one end of the rotor 300 is inserted through the second housing member 420, the encoder magnet is attached to a disc 340 which is disposed on one end of the rotor 300, and the sensor 600 and the encoder magnet are separated from the coil 210 by the second housing member 420 (see FIG. 24). The rotor magnets 320 and the encoder magnet are supported by the rotor 300 and polarized simultaneously. In other words, to polarize the rotor magnets 320 and the encoder magnet, polarizing jigs 730 and 740 for polarizing them are integrally used (see FIG. 25).

By configuring as described above, detection accuracy for the rotor 300 by the sensor 600 can be improved.

INDUSTRIAL APPLICABILITY

The present invention relates to a high-performance motor provided with a stator, a rotor and a housing for holding them, which excels in productivity, can be provided at a low price and is suitable as a motor for running a vehicle.

The invention claimed is:

1. A motor, comprising:

a stator, a rotor, and a housing for holding the stator and the rotor, wherein:

the housing includes a first housing member and a second housing member each having a bearing for supporting the rotor and a pin for mutually positioning the first housing member and the second housing member, the first housing member includes a recess portion for inserting the pin, the second housing member includes a hole for inserting the pin, and the pin includes a shoulder at a middle part thereof for preventing the pin from coming out of the hole, wherein:

said motor further includes a control unit disposed within the housing for supplying power to a coil of the motor and a through portion disposed between an inner surface of the housing and the second housing member for passing a wiring of the coil, said housing including the first housing member for covering the stator and the rotor, the second housing member for dividing an interior of the housing, and a third housing member for covering the control unit, said second housing member including a holding surface for holding the wiring of the coil along the inner surface of the housing.

2. The motor according to claim 1, further comprising a sensor disposed within the housing for detecting a position of the rotor, said sensor including Hall elements arranged on a substrate, said substrate including a plurality of terminals for connecting the Hall elements so that the sensor supports CW and CCW in a rotational direction of the rotor when a specific arrangement pattern of the Hall elements is selected.

3. The motor according to claim 1, further comprising a control unit disposed within the housing for supplying power to a coil of the motor and a sensor disposed within the housing for detecting a position of the rotor, said housing including the first housing member for covering the stator and the rotor, the second housing member for dividing an interior of the housing, and a third housing member for covering the control unit, said rotor including an encoder magnet, said sensor including Hall elements responsive to the encoder magnet, said rotor being arranged such that one end of the rotor passes through the second housing member and the other end of the rotor is attached to the encoder magnet, said second housing member blocking the encoder magnet and the sensor from the coil.

4. The motor according to claim 3, wherein said rotor includes a rotor magnet, said rotor magnet and said encoder magnet being polarized simultaneously after the rotor magnet and encoder magnet are supported on the rotor.

5. The motor according to claim 1, further comprising a control unit disposed within the housing for supplying power to a coil of the motor, said control including a switching element for switching a passage of current to the coil, said switching element fixed to a radiator having electrical conductivity and fixed to the housing via an insulating sheet, said radiator functioning as a power supply terminal for supplying power to the coil, said housing, said insulating sheet, and said radiator being assembled and screwed with a jig having a pin guided along a guide portion formed in each of the housing, the insulating sheet, and the radiator.

6. The motor according to claim 1, further comprising a control unit disposed within the housing for supplying power to a coil of the motor, said control unit including a switching element for switching a passage of current to the coil, said switching element being fixed to a radiator having electrical conductivity and fixed to the housing via an insulating sheet, said radiator functioning as a power supply terminal for supplying power to the coil, said insulating sheet protruding from opposing surfaces of the radiator and the housing.

7. The motor according to claim 1, further comprising a control unit disposed within the housing for supplying power to a coil of the motor, said control unit including a circuit board having a capacitor functioning as a power supply of the control unit, said capacitor including a supporting unit for suppressing vibration.

* * * * *